(12) United States Patent
Hayashi et al.

(10) Patent No.: US 11,377,328 B2
(45) Date of Patent: Jul. 5, 2022

(54) REMOTE OPERATION TERMINAL AND WORK VEHICLE COMPRISING REMOTE OPERATION TERMINAL

(71) Applicant: TADANO LTD., Kagawa (JP)

(72) Inventors: Hiroyuki Hayashi, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 106 days.

(21) Appl. No.: 16/977,721

(22) PCT Filed: Mar. 8, 2019

(86) PCT No.: PCT/JP2019/009282
§ 371 (c)(1),
(2) Date: Sep. 2, 2020

(87) PCT Pub. No.: WO2019/172409
PCT Pub. Date: Sep. 12, 2019

(65) Prior Publication Data
US 2021/0061622 A1   Mar. 4, 2021

(30) Foreign Application Priority Data

Mar. 9, 2018 (JP) .............................. JP2018-043250
Mar. 29, 2018 (JP) .............................. JP2018-066198

(51) Int. Cl.
*B66C 13/40* (2006.01)
*G05D 1/00* (2006.01)

(52) U.S. Cl.
CPC ........... *B66C 13/40* (2013.01); *G05D 1/0016* (2013.01)

(58) Field of Classification Search
CPC ......... B66C 13/40; B66C 23/44; B66C 23/48; B66C 23/905; B66C 23/88; G05D 1/0016
(Continued)

(56) References Cited

U.S. PATENT DOCUMENTS

2017/0016211 A1 * 1/2017 Arimatsu .............. G09G 5/377
2018/0079630 A1 * 3/2018 Ikeuchi ................... B66C 13/42

FOREIGN PATENT DOCUMENTS

JP   2007-126231 A   5/2007
JP   2007126231   *   5/2007

OTHER PUBLICATIONS

May 28, 2019, International Search Report issued for related PCT application No. PCT/JP2019/009282.
(Continued)

*Primary Examiner* — Muhammad Shafi
(74) *Attorney, Agent, or Firm* — Paratus Law Group, PLLC

(57) ABSTRACT

A problem to be addressed by the present invention is to provide a remote operation terminal and work vehicle comprising said remote operation terminal for enabling easy and straightforward carrying out of a remote operation of a work device. Provided is a remote operation terminal (32) of a crane device (6), said terminal comprising: a terminal-side control device (42) being a control part for controlling an operation of the remote operation terminal (32) and configured to enable communication with a control device (31) of the crane device (6); a load movement operation instrument (35) being a first operation part for remotely operating the crane device (6); and a reference change operation instrument (34) being a second operation part for setting a reference of an operation direction of the crane device (6) operated by the load movement operation instrument (35). The terminal-side control device (42): computes the operation direction of the crane device (6) with regard to the operation of the load movement operation instrument (35) on the basis of the setting value of the reference change operation instrument (34), and transmits said direction to the control device (31); and prevents a change of the setting
(Continued)

value while the load movement operation instrument (35) is being operated.

11 Claims, 24 Drawing Sheets

(58) Field of Classification Search
USPC .......................................................... 701/2
See application file for complete search history.

(56) References Cited

OTHER PUBLICATIONS

May 28, 2019, International Search Opinion issued for related PCT application No. PCT/JP2019/009282.

* cited by examiner

REMOTE OPERATION TERMINAL AND WORK VEHICLE COMPRISING REMOTE OPERATION TERMINAL

CROSS REFERENCE TO PRIOR APPLICATION

This application is a National Stage Patent Application of PCT International Patent Application No. PCT/JP2019/009282 (filed on Mar. 8, 2019) under 35 U.S.C. § 371, which claims priority to Japanese Patent Application Nos. 2018-043250 (filed on Mar. 9, 2018) and 2018-066198 (filed on Mar. 29, 2018), which are all hereby incorporated by reference in their entirety.

TECHNICAL FIELD

The present invention is applicable to a remote operation terminal and a work vehicle provided with a remote operation terminal.

BACKGROUND ART

Hitherto, in work vehicles provided with a work apparatus, such as a mobile crane and an aerial work platform, work vehicles in which an actuator of the work apparatus is remotely operated and remote operation terminals for operating the actuator of the work apparatus have been proposed. In work using a remote operation terminal, a worker is able to perform work while checking the state of movement of a suspended load near the suspended load or at a target position of the suspended load, remote from an operation apparatus of the work apparatus.

In such a work vehicle, a relative positional relation between the work apparatus and the remote operation terminal varies in accordance with a work situation. Therefore, a worker who operates the work apparatus with the remote operation terminal needs to manipulate a manipulation tool of the remote operation terminal while constantly considering the relative positional relation with the work apparatus. Therefore, there is known a remote operation terminal that enables easy and simple operation of a work apparatus by bringing a movement direction of a manipulation tool of a remote operation terminal into coincidence with a movement direction of the work apparatus regardless of a relative positional relation between the work apparatus and the remote operation terminal. This is as described in, for example, Patent Literature (hereinafter, abbreviated as PTL) 1.

A remote operation apparatus (remote operation terminal) described in PTL 1 is provided with a terminal reference absolute azimuth detection section that detects a reference absolute azimuth within a horizontal plane. Similarly, a work machine (work apparatus) control apparatus (controller) is provided with a work machine reference absolute azimuth detection section that detects a reference absolute azimuth within a horizontal plane. A movement direction command signal from the remote operation apparatus is output as a deviation angle with respect to the reference absolute azimuth of the terminal. The work machine (work apparatus) control apparatus is configured to calculate a movement direction, specified by the remote operation apparatus, from the deviation angle with respect to the work machine reference absolute azimuth. The remote operation apparatus includes a movement direction lock switch that locks a deviation angle with respect to the terminal reference absolute azimuth. The remote operation apparatus is enabled to, when the movement direction lock switch is manipulated, hold the movement direction of the work machine even when a hand shake or the like occurs.

However, since a deviation angle with respect to the reference absolute azimuth is locked by the movement direction lock switch, the remote operation apparatus described in PTL 1 is disabled to change the movement direction of the work machine during manipulation of the movement direction lock switch. In addition, when manipulation of the movement direction lock switch is cancelled in the remote operation apparatus, locking of a deviation angle with respect to the reference absolute azimuth is released, so, even when a manipulation tool is manipulated in the same direction, the work machine may be moved in a different direction. Therefore, an operator needs to constantly grasp the reference absolute azimuth of the remote operation apparatus while operating the remote operation apparatus, with the result that operation is complicated. When manipulation of the movement direction lock switch is cancelled in the remote operation apparatus, locking of a deviation angle with respect to the reference absolute azimuth is released, so, when the orientation of the remote operation apparatus is changed, a deviation angle with respect to the work machine reference absolute azimuth varies, with the result that the work machine may be moved in a different direction even when a manipulation tool is manipulated in the same direction. Therefore, an operator is not able to perform operation while changing the orientation of the remote operation apparatus so as to follow a load to be conveyed, with the result that operation may be complicated.

CITATION LIST

Patent Literature

PTL 1
Japanese Patent Application Laid-Open No. 2007-126231

SUMMARY OF INVENTION

Technical Problem

It is an object of the present invention to provide a remote operation terminal that prevents erroneous manipulation during remote operation of a work apparatus and that enables easy and simple remote operation of the work apparatus, and a work vehicle provided with the remote operation terminal.

Solution to Problem

The technical problem to be solved by the present invention is as described above, and a solution to this problem will be described next.

More specifically, a remote operation terminal for a work apparatus provided in a work vehicle, the remote operation terminal comprising: a control section that is configured to be capable of obtaining a signal from a control apparatus of the work apparatus and that controls operation of the remote operation terminal; a first manipulation section used to remotely operate the work apparatus; and a second manipulation section used to set a reference of a direction in which the work apparatus moves as a result of manipulation of the first manipulation section, wherein the control section preferably calculates a direction in which the work apparatus moves for manipulation of the first manipulation section, based on a set value of the second manipulation section and transmits the direction to the control apparatus, and disables a change of the set value while the first manipulation section is being manipulated.

In the remote operation terminal according to the present invention, when the control section obtains a manipulation signal from the first manipulation section, the control section transmits, to the control apparatus, a control signal converted from the manipulation signal of the first manipulation section based on the set value of the second manipulation section, and while obtaining the manipulation signal, the control section invalidates a manipulation signal of the second manipulation section.

The remote operation terminal according to the present invention further comprises: a third manipulation section that enables transmission of a control signal converted from a manipulation signal of the first manipulation section based on the set value of the second manipulation section, wherein while the control section is obtaining a manipulation signal from the third manipulation section, the control section enables transmission of the control signal to the control apparatus and invalidates a manipulation signal of the second manipulation section.

A remote operation terminal according to the present invention is a terminal for a work apparatus provided in a work vehicle, the remote operation terminal comprising: a control section that is configured to be capable of communicating with a control apparatus of the work apparatus and that controls operation of the remote operation terminal; a first manipulation section used to remotely operate the work apparatus; and a reference setting section that automatically sets a reference of a direction in which the work apparatus moves as a result of manipulation of the first manipulation section, wherein the control section calculates a direction in which the work apparatus moves for manipulation of the first manipulation section based on a set value of the reference setting section and transmits the direction to the control apparatus, and disables a change of the set value while the first manipulation section is being manipulated.

A work vehicle according to the present invention is a vehicle provided with a work apparatus that is remotely operated, the work vehicle comprising: a remote operation terminal including a first manipulation section used to remotely operate the work apparatus and a second manipulation section used to set a reference of a direction in which the work apparatus moves as a result of manipulation of the first manipulation section; and a control apparatus that is configured to be capable of obtaining a signal from the remote operation terminal and that controls movement of the work apparatus, wherein the remote operation terminal calculates a direction in which the work apparatus moves for manipulation of the first manipulation section based on a set value of the second manipulation section and transmits the direction to the control apparatus, and disables a change of the set value while the first manipulation section is being manipulated, and the control apparatus causes the work apparatus to move in the direction in which the work apparatus moves, the direction being obtained from the remote operation terminal.

A remote operation terminal according to the present invention is a terminal for a work apparatus provided in a work vehicle, the remote operation terminal comprising: a control section that is configured to be capable of obtaining a signal from a control apparatus of the work apparatus and that controls operation of the remote operation terminal; a first manipulation section used to remotely operate the work apparatus based on a manipulation direction reference of the remote operation terminal; and a second manipulation section used to lock a control signal related to a tilting direction within a control signal of the first manipulation section and to enable a change of the manipulation direction reference with the first manipulation tool.

In the remote operation terminal according to the present invention, when the control section obtains a manipulation signal to change a tilting direction of the first manipulation tool in a state where a manipulation signal from the second manipulation section is obtained, the control section locks the control signal related to the tilting direction to a control signal related to the tilting direction of the first manipulation tool before the tilting direction is changed, and transmits the control signal to the control apparatus, and changes the manipulation direction reference such that the tilting direction of the first manipulation tool of which the tilting direction is changed becomes the tilting direction of the first manipulation tool before the tilting direction is changed.

In the remote operation terminal according to the present invention, when the control section determines that a manipulation signal from the second manipulation section is stopped or when the control section obtains a manipulation signal to disable a change of the manipulation direction reference from the second manipulation section, the control section locks the changed manipulation direction reference and releases locking of the control signal related to the tilting direction of the first manipulation tool.

A remote operation terminal according to the present invention is a terminal for a work apparatus provided in a work vehicle, the remote operation terminal comprising: a control section that is configured to be capable of communicating with a control apparatus of the work apparatus and that controls operation of the remote operation terminal; a manipulation section used to remotely operate the work apparatus; a first manipulation section used to remotely operate the work apparatus based on a manipulation direction reference of the remote operation terminal; a second manipulation section used to lock a control signal related to a tilting direction within a control signal of the first manipulation section and to enable a change of the manipulation direction reference with the first manipulation tool; and a reference setting section that automatically sets the manipulation direction reference, wherein when the control section obtains a manipulation signal to change a tilting direction of the first manipulation tool in a state where a manipulation signal from the second manipulation section is obtained, the control section locks the control signal related to the tilting direction to the control signal related to the tilting direction of the first manipulation tool before the tilting direction is changed, transmits the control signal to the control apparatus, disables automatic setting of the manipulation direction reference, and changes the manipulation direction reference such that the tilting direction of the first manipulation tool of which the tilting direction is changed becomes the tilting direction of the first manipulation tool before the tilting direction is changed.

A work vehicle according to the present invention is provided with a work apparatus that is remotely operated, the work vehicle comprising: a remote operation terminal including a first manipulation section used to remotely operate the work apparatus based on an manipulation direction reference, and a second manipulation section used to lock a control signal related to a tilting direction within a control signal of the first manipulation section and to enable a change of the manipulation direction reference with the first manipulation tool; and a control apparatus that is configured to be capable of communicating with the remote operation terminal and that controls movement of the work apparatus, wherein when a tilting direction of the first manipulation tool is changed in a state where the second manipulation section is manipulated, the remote operation terminal locks the control signal related to the tilting direction to the control signal related to the tilting direction of the first manipulation tool before the tilting direction is changed, and transmits the control signal to the control apparatus, and changes the manipulation direction reference such that the tilting direction of the first manipulation tool of which the tilting direction is changed becomes the tilting direction of the first manipulation tool before the tilting direction is changed, and the control apparatus causes the work apparatus to move based on a manipulation signal with the changed manipulation direction reference obtained from the remote operation terminal.

Advantageous Effects of Invention

The present invention provides advantageous effects as described below.

With the remote operation terminal and the work vehicle of the present invention, the reference of the direction in which the work apparatus moves, set to a selected value with the second manipulation section, is not changed while the first manipulation section is being manipulated, so an operator does not lose the identified direction in which the work apparatus moves for the manipulation direction of the first manipulation section during operation. Thus, erroneous manipulation during remote operation of the work apparatus is prevented, and it is possible to easily and simply perform remote operation of the work apparatus.

With the remote operation terminal of the present invention, while the first manipulation section is being manipulated, the set reference of the direction in which the work apparatus moves is not changed even when the second manipulation section is erroneously manipulated, so an operator does not lose the identified direction in which the work apparatus moves for the manipulation direction of the first manipulation section during operation. Thus, erroneous manipulation during remote operation of the work apparatus is prevented, and it is possible to easily and simply perform remote operation of the work apparatus.

With the remote operation terminal of the present invention, the reference of the direction in which the work apparatus moves is not changed while the third manipulation section that functions as a deadman switch for the first manipulation section is being manipulated, so an operator does not lose the identified direction in which the work apparatus moves for the manipulation direction of the first manipulation section during operation. Thus, erroneous manipulation during remote operation of the work apparatus is prevented, and it is possible to easily and simply perform remote operation of the work apparatus.

With the remote operation terminal of the present invention, the automatically set reference of the direction in which the work apparatus moves is not changed while the first manipulation section is being manipulated, so an operator does not lose the identified direction in which the work apparatus moves for the manipulation direction of the first manipulation section during operation. Thus, erroneous manipulation during remote operation of the work apparatus is prevented, and it is possible to easily and simply perform remote operation of the work apparatus.

With the remote operation terminal and the work vehicle of the present invention, when the second manipulation section is manipulated, the manipulation direction reference is changed to a direction desired by an operator by manipulation of the first manipulation section in a state where the direction in which the work apparatus moves as a result of manipulation of the first manipulation section is locked, so the operator does not lose the identified direction in which the work apparatus moves for the tilting direction of the first manipulation section during operation. Thus, erroneous manipulation during remote operation of the work apparatus is prevented, and it is possible to easily and simply perform remote operation of the work apparatus.

With the remote operation terminal of the present invention, when manipulation of the second manipulation section is stopped, the manipulation direction reference is locked to a direction desired by an operator, and the work apparatus is moved in accordance with manipulation of the first manipulation section, so the tilting direction of the first manipulation tool and the direction in which the work apparatus moves coincide with each other. Thus, erroneous manipulation during remote operation of the work apparatus is prevented, and it is possible to easily and simply perform remote operation of the work apparatus.

With the remote operation terminal of the present invention, the manipulation direction reference is not automatically set and is set in accordance with manipulation of the first manipulation section while the first manipulation section is being manipulated, so an operator does not lose the identified direction in which the work apparatus moves for the tilting direction of the first manipulation section during operation. Thus, erroneous manipulation during remote operation of the work apparatus is prevented, and it is possible to easily and simply perform remote operation of the work apparatus.

DESCRIPTION OF EMBODIMENTS

Embodiment 1

Hereinafter, crane 1 that is a mobile crane (rough terrain crane) as a work vehicle according to Embodiment 1 of the present invention will be described with reference to FIGS. 1 and 2. In the present embodiment, a crane (rough terrain crane) will be described as a work vehicle. Alternatively, an all-terrain crane, a truck crane, a loading truck crane, an aerial work platform, or the like may also be applied as work vehicle 2.

Figure 1:
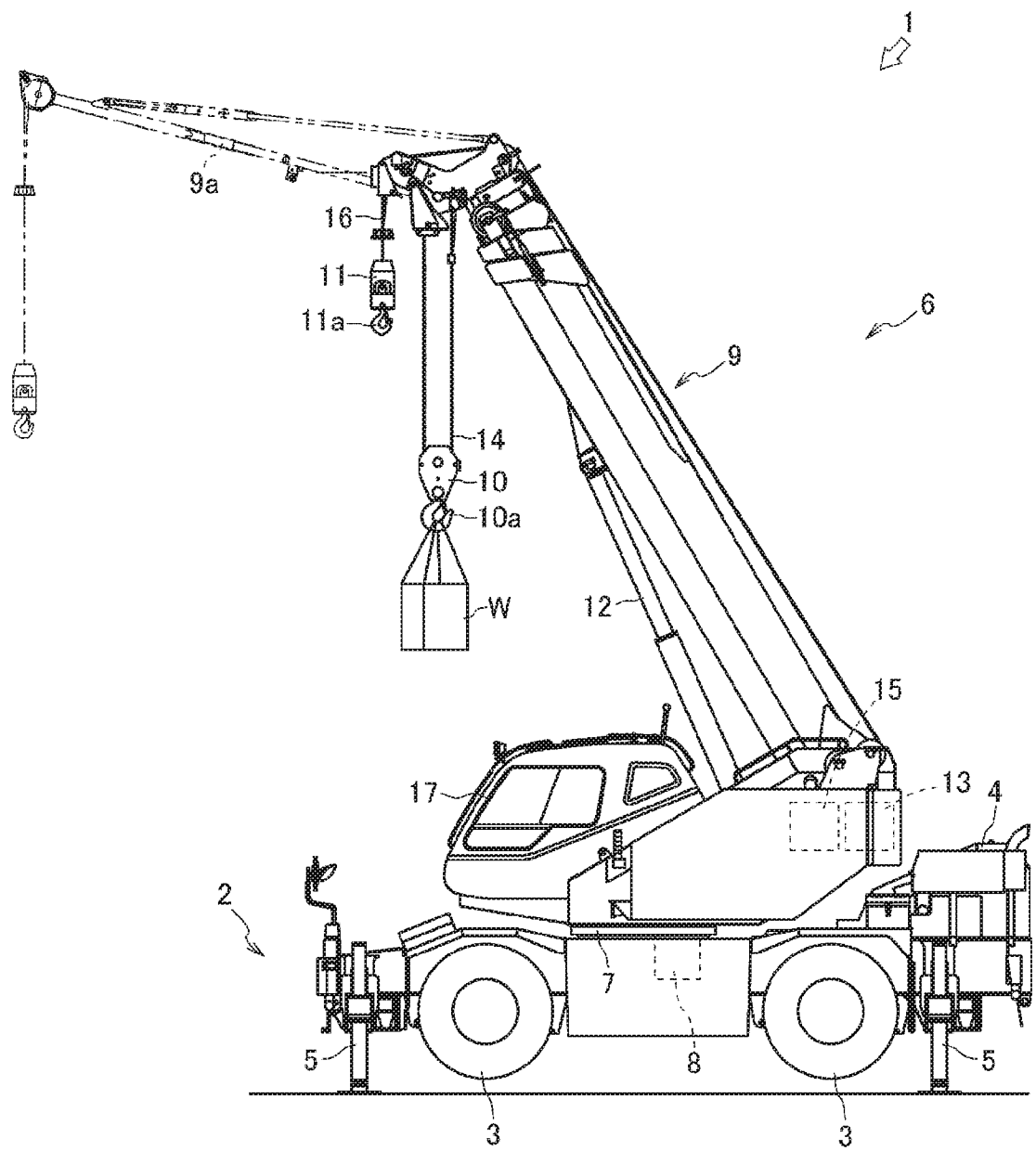
FIG. 1 is a side view illustrating the entire configuration of a crane.

As illustrated in FIG. 1, crane 1 is a mobile crane that is capable of moving to an unspecified place. Crane 1 includes vehicle 2, crane apparatus 6 that is a work apparatus, and remote operation terminal 32 (see FIG. 2) that enables remote operation of crane apparatus 6.

Vehicle 2 carries crane apparatus 6. Vehicle 2 includes a plurality of wheels 3 and travels by using engine 4 as a power source. Vehicle 2 is provided with outriggers 5. Outriggers 5 are made up of projecting beams hydraulically extendable on both sides of vehicle 2 in the width direction and hydraulic jack cylinders extendable in the direction vertical to the ground. Vehicle 2 is capable of extending a workable area of crane 1 by extending outriggers 5 in the width direction of vehicle 2 and bringing the jack cylinders into contact with the ground.

Crane apparatus 6 hoists upload W with a wire rope. Crane apparatus 6 includes swivel base 7, boom 9, jib 9a, main hook block 10, sub hook block 11, hydraulic luffing cylinder 12, main winch 13, main wire rope 14, sub winch 15, sub wire rope 16, cabin 17, and the like.

Swivel base 7 enables crane apparatus 6 to swivel. Swivel base 7 is provided on a frame of vehicle 2 via an annular bearing. Swivel base 7 is configured to be capable of rotating about the center of the annular bearing. Swivel base 7 is provided with hydraulic-type hydraulic swivel motor 8 that is an actuator. Swivel base 7 is configured to be capable of swiveling in one direction and the other direction by means of hydraulic swivel motor 8.

Hydraulic swivel motor 8 that is an actuator is operated to rotate by swiveling valve 23 (see FIG. 2) that is an electromagnetic proportional switching valve. Swiveling valve 23 is capable of controlling the flow rate of operating oil to be supplied to hydraulic swivel motor 8 to a selected flow rate. In other words, swivel base 7 is configured to be controllable to a selected swivel speed via hydraulic swivel motor 8 operated to rotate by swiveling valve 23. Swivel base 7 is provided with swiveling sensor 27 (see FIG. 2) that detects the swivel position (angle) and swivel speed of swivel base 7.

Boom 9 that is a boom supports the wire rope such that the wire rope is able to hoist up load W. Boom 9 is made up of a plurality of boom members. Boom 9 is provided such that the base end of a base boom member is swingably provided at substantially the center of swivel base 7. Boom 9 is configured to be capable of extending and retracting in the axial direction by moving the boom members with a hydraulic extension/retraction cylinder (not illustrated) that is an actuator. Boom 9 is provided with jib 9a. Jib 9a is held by a jib supporting part provided in the base boom member of boom 9 in a position along the base boom member. The base end of jib 9a is enabled to be coupled to a jib supporting part of a top boom member.

The hydraulic extension/retraction cylinder (not illustrated) that is an actuator is operated to extend and retract by extension/retraction valve 24 (see FIG. 2) that is an electromagnetic proportional switching valve. Extension/retraction valve 24 is capable of controlling the flow rate of operating oil to be supplied to a hydraulic extension/retraction cylinder to a selected flow rate. Boom 9 is provided with extension/retraction sensor 28 that detects the length of boom 9 and weight sensor 29 (see FIG. 2) that detects the weight of load W.

Camera 9b (see FIG. 2) that is a detecting apparatus takes the images of load W and planimetric features around load W. Camera 9b is provided at the distal end portion of boom 9. Camera 9b is configured to be capable of taking the images of load W and planimetric features and topographic features around crane 1 from vertically above load W.

Main hook block 10 and sub hook block 11 are used to hang load W. Main hook block 10 is provided with a plurality of hook sheaves around which main wire rope 14 is wound, and main hook 10a used to hang load W. Sub hook block 11 is provided with sub hook 11a used to hang load W.

Hydraulic luffing cylinder 12 that is an actuator luffs up and down boom 9 and holds the position of boom 9. In hydraulic luffing cylinder 12, an end of a cylinder part is swingably coupled to swivel base 7, and an end of a rod part is swingably coupled to the base boom member of boom 9. Hydraulic luffing cylinder 12 is operated to extend and retract by luffing valve 25 (see FIG. 2) that is an electromagnetic proportional switching valve. Luffing valve 25 is capable of controlling the flow rate of operating oil to be supplied to hydraulic luffing cylinder 12 to a selected flow rate. Boom 9 is provided with luffing sensor 30 (see FIG. 2) that detects the luffing angle of boom 9.

Main winch 13 and sub winch 15 wind up (reel up) and feed out (release) main wire rope 14 and sub wire rope 16, respectively. Main winch 13 has a configuration in which a main drum around which main wire rope 14 is wound is rotated by a main hydraulic motor (not illustrated) that is an actuator, and sub winch 15 has a configuration in which a sub drum around which sub wire rope 16 is wound is rotated by a sub hydraulic motor (not illustrated) that is an actuator.

The main hydraulic motor is operated to rotate by main valve 26m (see FIG. 2) that is an electromagnetic proportional switching valve. Main winch 13 is enabled to be operated to a selected wind-up and feed-out rate by controlling the main hydraulic motor with main valve 26m. Similarly, sub winch 15 is enabled to be operated to a selected wind-up and feed-out rate by controlling the sub hydraulic motor with sub valve 26s (see FIG. 2) that is an electromagnetic proportional switching valve.

Cabin 17 covers an operator compartment. Cabin 17 is mounted on swivel base 7. Cabin 17 is provided with an operator compartment (not illustrated). The operator compartment is provided with manipulation tools for operating to cause vehicle 2 to travel, swivel manipulation tool 18, luffing manipulation tool 19, extension/retraction manipulation tool 20, main-drum manipulation tool 21m, sub-drum manipulation tool 21s, and the like for operating crane apparatus 6 (see FIG. 2). Swivel manipulation tool 18 enables operation of hydraulic swivel motor 8. Luffing manipulation tool 19 enables operation of hydraulic luffing cylinder 12. Extension/retraction manipulation tool 20 enables operation of the hydraulic extension/retraction cylinder. Main-drum manipulation tool 21m enables operation of the main hydraulic motor. Sub-drum manipulation tool 21s enables operation of the sub hydraulic motor.

Communication device 22 (see FIG. 2) receives a control signal from remote operation terminal 32 and transmits control information and the like from crane apparatus 6. Communication device 22 is provided in cabin 17. Communication device 22 is configured to, when communication device 22 receives a control signal or the like from remote operation terminal 32, transfer the control signal or the like to control apparatus 31 via a communication line (not shown). Communication device 22 is also configured to transfer control information from control apparatus 31 or video image i from camera 9b to remote operation terminal 32 via the communication line (not shown).

Figure 2:
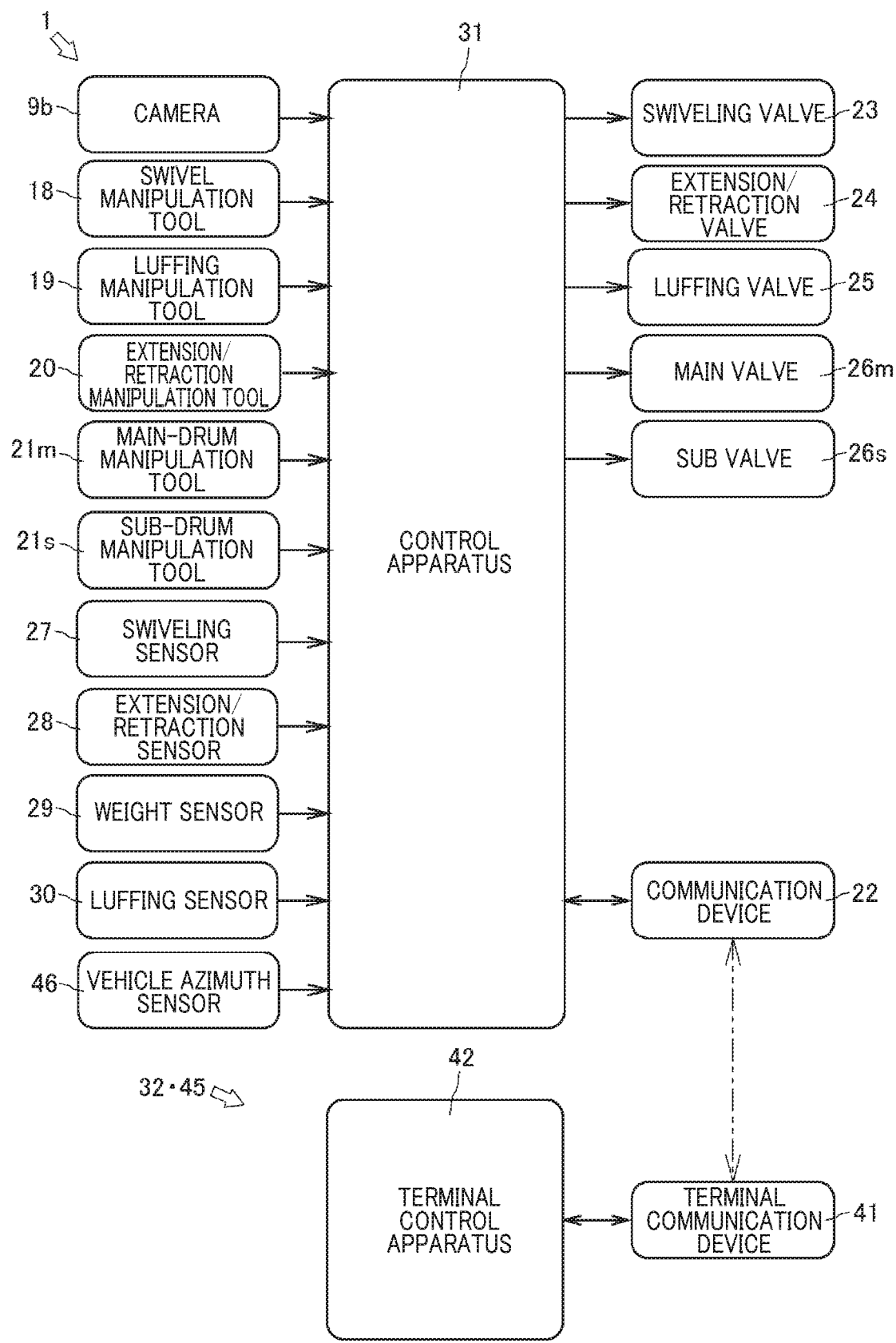
FIG. 2 is a block diagram illustrating the control configuration of the crane in Embodiment 1 and Embodiment 3.

As shown in FIG. 2, control apparatus 31 controls the actuators of crane 1 via control valves. Control apparatus 31 is provided inside cabin 17. Substantively, control apparatus 31 may be made up of a CPU, ROM, RAM, HDD, and the like connected to one another via a bus or may be made up of a one-chip LSI or the like. Control apparatus 31 stores various programs and data in order to control the operations of the actuators, switching valves, sensors, and the like.

Control apparatus 31 is connected to camera 9b, swivel manipulation tool 18, luffing manipulation tool 19, extension/retraction manipulation tool 20, main-drum manipulation tool 21m, and sub-drum manipulation tool 21s, and is capable of obtaining video image i of camera 9b and obtaining the manipulation amount of each of swivel manipulation tool 18, luffing manipulation tool 19, main-drum manipulation tool 21m, and sub-drum manipulation tool 21s.

Control apparatus 31 is connected to communication device 22 and is capable of obtaining a control signal from remote operation terminal 32 and transmitting control information from the crane apparatus 6 and video image i or the like from camera 9b.

Control apparatus 31 is connected to swiveling valve 23, extension/retraction valve 24, luffing valve 25, main valve 26m, and sub valve 26s and is capable of transmitting control signals to swiveling valve 23, luffing valve 25, main valve 26m, and sub valve 26s.

Control apparatus 31 is connected to swiveling sensor 27, extension/retraction sensor 28, weight sensor 29, and luffing sensor 30 and is capable of obtaining the swivel position of swivel base 7, boom length, luffing angle, and the weight of load W.

Control apparatus 31 generates control signals respectively associated with swivel manipulation tool 18, luffing manipulation tool 19, main-drum manipulation tool 21m, and sub-drum manipulation tool 21s based on the manipulation amounts of the associated manipulation tools.

Thus configured crane 1 is capable of moving crane apparatus 6 to a selected position by causing vehicle 2 to travel. Crane 1 is capable of expanding the lifting height and the movement radius of crane apparatus 6 by luffing up boom 9 to a selected luffing angle with hydraulic luffing cylinder 12 by manipulation of luffing manipulation tool 19 and extending boom 9 to a selected boom 9 length by manipulation of extension/retraction manipulation tool 20. Crane 1 is also capable of conveying load W by hoisting up load W with sub-drum manipulation tool 21s and the like and swiveling swivel base 7 by manipulation of swivel manipulation tool 18.

Next, remote operation terminal 32 will be described with reference to FIGS. 3 to 5A and 5B.

Figure 3:
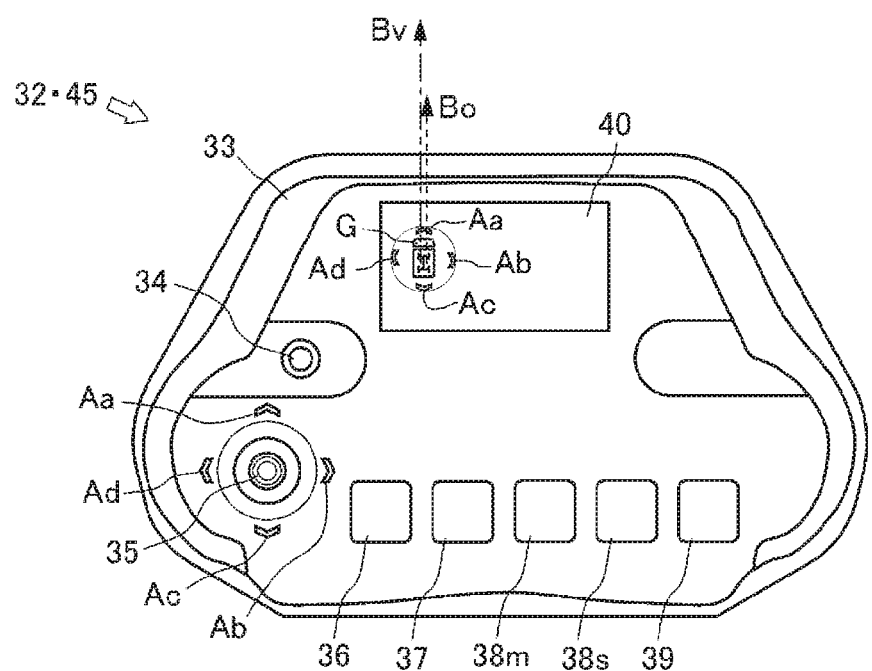
FIG. 3 is a plan view illustrating the schematic configuration of a remote operation terminal.

As shown in FIG. 3, remote operation terminal 32 is used in remotely operating crane 1. Remote operation terminal 32 includes main body part 33, suspended load movement manipulation tool 35 that is a first manipulation section provided on an operating face of main body part 33, reference change manipulation tool 34 that is a second manipulation section, terminal swivel manipulation tool 36, terminal extension/retraction manipulation tool 37, terminal main-drum manipulation tool 38m, terminal sub-drum manipulation tool 38s, terminal luffing manipulation tool 39, terminal display apparatus 40, terminal communication device 41, terminal control apparatus 42 (see FIGS. 2 and 4), and the like. Remote operation terminal 32 sets manipulation direction reference Bo with reference change manipulation tool 34 and transmits control signals for the control valves of the actuators for moving load W by manipulation of suspended load movement manipulation tool 35 or various manipulation tools to crane apparatus 6.

Manipulation direction reference Bo of remote operation terminal 32 is a reference for setting the movement direction of load W to be moved by tilting manipulation of suspended load movement manipulation tool 35 in a selected direction with respect to vehicle 2 (vehicle direction reference Bv). Specifically, manipulation direction reference Bo is a reference for setting correction angle θ1 for correcting the movement direction of load W (the movement direction of crane apparatus 6) that moves as a result of tilting manipulation of suspended load movement manipulation tool 35 in a selected direction with respect to vehicle direction reference By that is the reference of vehicle 2. In the present embodiment, vehicle direction reference By is set to a forward direction that is a forward travel direction of vehicle 2 (see the alternate long and short dashed-line arrow), and manipulation direction reference Bo of remote operation terminal 32 is set to an upward manipulation direction (see the dashed-line arrow) when facing the operating face of main body part 33.

Main body part 33 is a main component member of remote operation terminal 32. Main body part 33 is formed in a case with a size that an operator is able to hold by hand. Main body part 33 is provided on its operating face with suspended load movement manipulation tool 35, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, terminal display apparatus 40, and terminal communication device 41 (see FIGS. 2 and 4).

Reference change manipulation tool 34 that is the second manipulation section receives an instruction to change the position of manipulation direction reference Bo with respect to vehicle direction reference By. Reference change manipulation tool 34 is made up of a rotary knob protruding from the operating face of main body part 33 and a sensor (not illustrated) that detects the rotation direction and the rotation amount, that is, the rotation position of the rotary knob. Reference change manipulation tool 34 is configured such that the rotary knob can be manipulated to rotate in a selected direction. Reference change manipulation tool 34 is configured to transmit, to terminal control apparatus 42, a signal on correction angle θ1 (see FIG. 5A) that is the angle from vehicle direction reference By to manipulation direction reference Bo by using the rotation position of the rotary knob.

Suspended load movement manipulation tool 35 that is the first manipulation section receives an instruction to move load W at a selected rate in a selected direction in a selected horizontal plane. Suspended load movement manipulation tool 35 is made up of a manipulation stick upright substantially vertically from the operating face of main body part 33 and a sensor (not illustrated) that detects the tilting direction and the tilting amount of the manipulation stick. Suspended load movement manipulation tool 35 is configured such that the manipulation stick can be manipulated to tilt in a selected direction. Suspended load movement manipulation tool 35 is configured to transmit, to terminal control apparatus 42, a signal on tilting angle θ2 (see FIG. 5B) between the tilting direction of the manipulation stick, detected by the sensor, and manipulation direction reference Bo and its tilting amount. Arrow Aa indicating an upward direction when facing the operating face of main body part 33, arrow Ab indicating a right-hand direction when facing the operating face, arrow Ac indicating a downward direction when facing the operating face, and arrow Ad indicating a left-hand direction when facing the operating face are shown on suspended load movement manipulation tool 35 as a guide for tilting angle θ2 of suspended load movement manipulation tool 35.

Terminal swivel manipulation tool 36 receives an instruction to swivel crane apparatus 6 at a selected movement rate in a selected movement direction. Terminal swivel manipulation tool 36 is made up of a manipulation stick upright substantially vertically from the operating face of main body part 33 and a sensor (not illustrated) that detects the tilting direction and the tilting amount of the manipulation stick. Terminal swivel manipulation tool 36 is configured to be able to tilt in each of a direction to provide an instruction to swivel to the left and a direction to provide an instruction to swivel to the right.

Terminal extension/retraction manipulation tool 37 receives an instruction to extend or retract boom 9 at a selected rate. Terminal extension/retraction manipulation tool 37 is made up of a manipulation stick upright from the operating face of main body part 33 and a sensor (not illustrated) that detects the tilting direction and the tilting amount of the manipulation stick. Terminal extension/retraction manipulation tool 37 is configured to be able to tilt in each of a direction to provide an instruction to extend and a direction to provide an instruction to retract.

Terminal main-drum manipulation tool 38m receives an instruction to rotate main winch 13 at a selected rate in a selected direction. Terminal main-drum manipulation tool 38m is made up of a manipulation stick upright from the operating face of main body part 33 and a sensor (not illustrated) that detects the tilting direction and the tilting amount of the manipulation stick. Terminal main-drum manipulation tool 38m is configured to be able to tilt in each of a direction to provide an instruction to wind up main wire rope 14 and a direction to provide an instruction to feed out main wire rope 14. Terminal sub-drum manipulation tool 38s is also similarly configured.

Terminal luffing manipulation tool 39 receives an instruction to luff up or down boom 9 at a selected rate. Terminal luffing manipulation tool 39 is made up of a manipulation stick upright from the operating face of main body part 33 and a sensor (not illustrated) that detects the tilting direction and the tilting amount of the manipulation stick. Terminal luffing manipulation tool 39 is configured to be able to tilt in each of a direction to provide an instruction to luff up and a direction to provide an instruction to luff down.

Terminal display apparatus 40 displays various pieces of information, such as information on the position of crane 1 and information on load W Terminal display apparatus 40 is made up of an image display apparatus, such as a liquid crystal screen. Terminal display apparatus 40 is provided on the operating face of main body part 33. Reference graphic G that schematically illustrates vehicle 2 of crane 1 is displayed on terminal display apparatus 40 as an image indicating the orientation of manipulation direction reference Bo of remote operation terminal 32. Reference graphic G is drawn so that vehicle direction reference By of vehicle 2 can be identified. Reference graphic G is rotated in synchronization with the rotation position of reference change manipulation tool 34. In other words, the relative positional relation between manipulation direction reference Bo (see the continuous-line arrow) that reflects the rotation direction and the rotation amount of reference change manipulation tool 34 and vehicle direction reference By (see the alternate long and two-short dashed-line arrow) is displayed on terminal display apparatus 40.

Arrow Aa indicating an upward direction when facing the operating face of main body part 33, arrow Ab indicating a right-hand direction when facing the operating face, arrow Ac indicating a downward direction when facing the operating face, and arrow Ad indicating a left-hand direction when facing the operating face are shown on terminal display apparatus 40 as a guide for tilting angle θ2 of suspended load movement manipulation tool 35, so as to surround reference graphic G.

Figure 4:
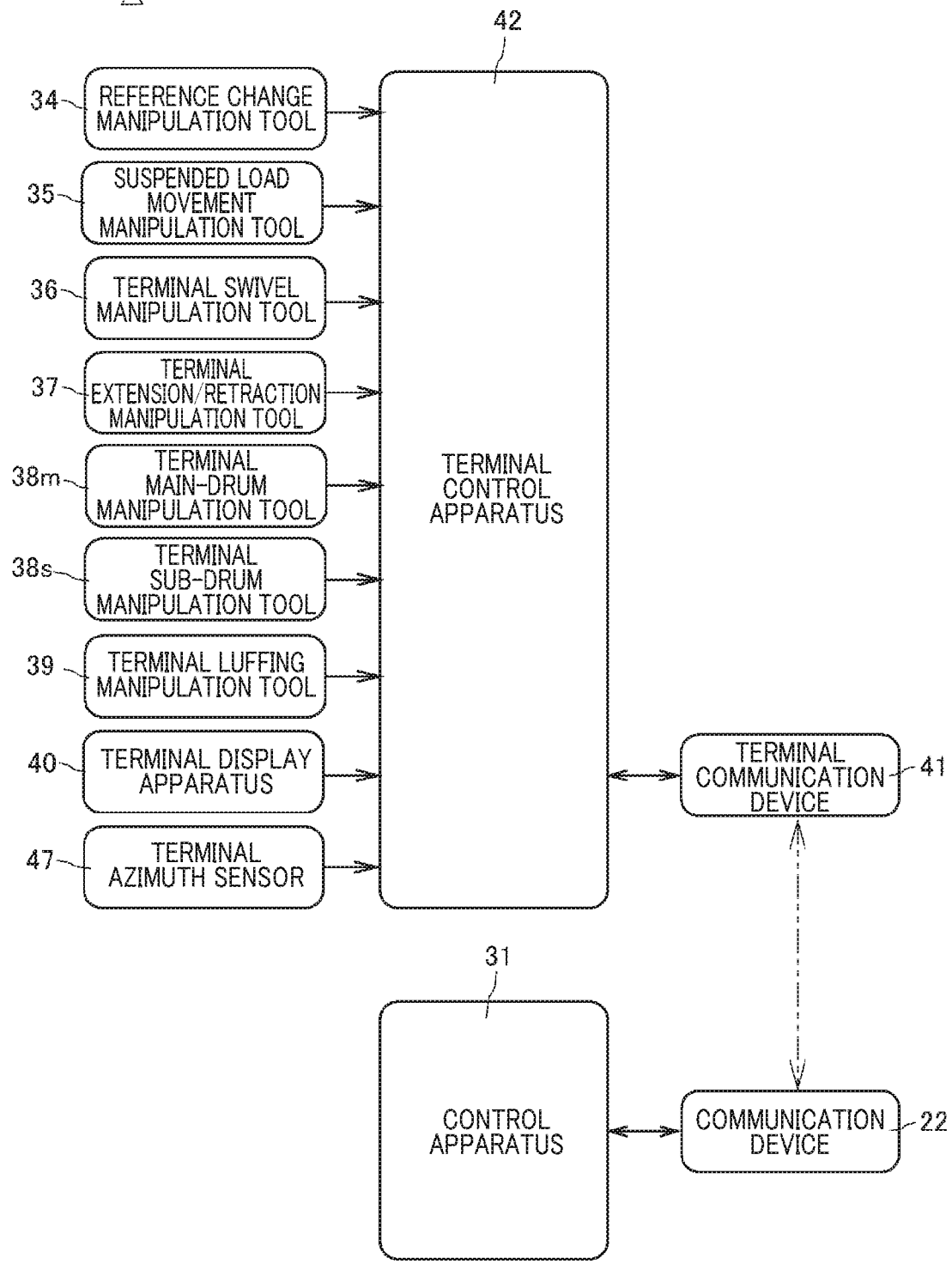
FIG. 4 is a block diagram illustrating the control configuration of the remote operation terminal in Embodiment 1 and Embodiment 3.

As shown in FIG. 4, terminal communication device 41 receives control information and the like of crane apparatus 6 and transmits control information and the like from remote operation terminal 32. Terminal communication device 41 is provided inside main body part 33. Terminal communication device 41 is configured to, when terminal communication device 41 receives video image i, a control signal, or the like from crane apparatus 6, transmit video image i, the control signal, or the like to terminal control apparatus 42. Terminal communication device 41 is also configured to transmit control information from terminal control apparatus 42 to crane apparatus 6 of crane 1.

Terminal control apparatus 42 that is a control section controls remote operation terminal 32. Terminal control apparatus 42 is provided inside main body part 33 of remote operation terminal 32. Substantively, terminal control apparatus 42 may be made up of a CPU, ROM, RAM, HDD, and the like connected to one another via a bus or may be made up of a one-chip LSI or the like. Terminal control apparatus 42 stores various programs and data in order to control the operations of suspended load movement manipulation tool 35, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, terminal display apparatus 40, terminal communication device 41, and the like.

Terminal control apparatus 42 is connected to suspended load movement manipulation tool 35, terminal swivel manipulation tool 36, terminal extension/retraction manipulation tool 37, terminal main-drum manipulation tool 38m, terminal sub-drum manipulation tool 38s, and terminal luffing manipulation tool 39 and is capable of obtaining a manipulation signal composed of the tilting direction and the tilting amount of the manipulation stick of each manipulation tool. Terminal control apparatus 42 is also connected to reference change manipulation tool 34 and is capable of obtaining a manipulation signal composed of the rotation direction and the rotation angle, that is, the rotation position of reference change manipulation tool 34.

Terminal control apparatus 42 is capable of generating control signals from manipulation signals of the manipulation sticks, obtained from the sensors of terminal swivel manipulation tool 36, terminal extension/retraction manipulation tool 37, terminal main-drum manipulation tool 38m, terminal sub-drum manipulation tool 38s, and terminal luffing manipulation tool 39 for associated swiveling valve 23, extension/retraction valve 24, luffing valve 25, main valve 26m, and sub valve 26s.

Terminal control apparatus 42 is connected to terminal display apparatus 40 and is capable of causing terminal display apparatus 40 to display video image i and various pieces of information from crane apparatus 6. Terminal control apparatus 42 is capable of rotating and displaying reference graphic G (or reference coordinate axes) in synchronization with correction angle θ1 and a rotation direction obtained from the rotation position of the rotary knob of reference change manipulation tool 34. Terminal control apparatus 42 is connected to terminal communication device 41 and is capable of transmitting or receiving various pieces of information to or from communication device 22 of crane apparatus 6 via terminal communication device 41.

Figure 5A:
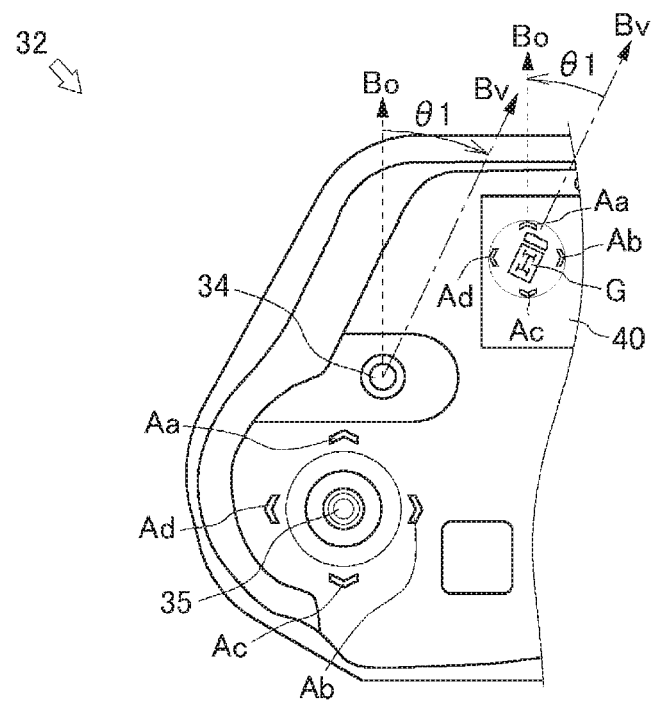
FIG. 5A is a partially enlarged view illustrating a manipulation direction reference when a reference change manipulation tool of the remote operation terminal is manipulated in Embodiment 1.

As shown in FIG. 5A, terminal control apparatus 42 (see FIG. 4) relatively rotates manipulation direction reference Bo with respect to vehicle direction reference By based on a manipulation signal on the rotation direction that is the rotation position obtained from reference change manipulation tool 34 manipulated to rotate and correction angle θ1 that is the angle from vehicle direction reference By. For example, when reference change manipulation tool 34 is manipulated to rotate to a position of angle θ1 in one direction (right-hand direction in FIG. 5A), terminal control apparatus 42 corrects the direction of manipulation direction reference Bo by rotating manipulation direction reference Bo by correction angle θ1 in the other direction (left-hand direction in FIG. 5A) from vehicle direction reference By as a correction direction. At this time, terminal control apparatus 42 rotates reference graphic G displayed on terminal display apparatus 40 to the position of correction angle θ1 in one direction (right-hand direction in FIG. 5A) from the upward direction of remote operation terminal 32, which is the direction of manipulation direction reference Bo, based on a manipulation signal on correction angle θ1 from reference change manipulation tool 34.

Figure 5B:
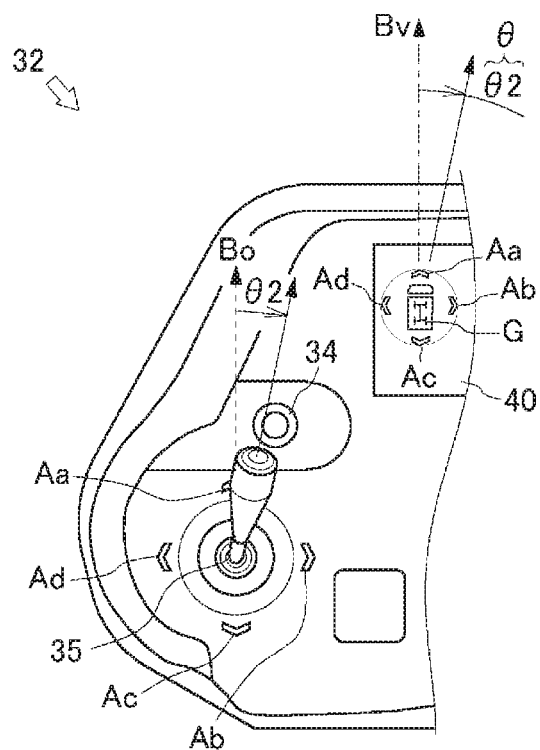
FIG. 5B is a partially enlarged view illustrating a conveyance direction of a load when a suspended load movement manipulation tool is manipulated in Embodiment 1.

As shown in FIG. 5B, terminal control apparatus 42 (see FIG. 4) calculates the movement direction and the movement rate of load W from manipulation direction reference Bo based on a manipulation signal on tilting angle θ2 that is an angle from manipulation direction reference Bo to the tilting direction of the manipulation stick, the tilting direction, and a tilting amount, obtained from suspended load movement manipulation tool 35. When, for example, suspended load movement manipulation tool 35 is manipulated to tilt by tilting angle θ2 to one of the right and left sides of manipulation direction reference Bo in a state where the direction of manipulation direction reference Bo and the direction of vehicle direction reference By coincide with each other, terminal control apparatus 42 calculates movement angle θ of load W with respect to vehicle direction reference By from correction angle θ1 (in FIG. 5B, correction angle θ1 is 0°) and its correction direction (no correction direction is set because correction angle θ1 is 0° in FIG. 5B), set by reference change manipulation tool 34, and tilting angle θ2. Terminal control apparatus 42 calculates a control signal for moving load W at a movement rate according to the tilting amount to the direction of movement angle θ.

Next, setting of manipulation direction reference Bo in remote operation terminal 32 and control of crane apparatus 6 by using remote operation terminal 32 will be described with reference to FIGS. 6 to 8. As the directions of vehicle 2 of crane 1, a forward travel direction of vehicle 2 (a direction toward cabin 17 from boom 9) is defined as forward direction, a reverse travel direction (a direction across boom 9) is defined as rearward direction, a right-hand side when facing the forward direction is defined as right-hand direction, and a left-hand side when facing the forward direction is defined as left-hand direction. In the present embodiment, it is assumed that vehicle direction reference By (the alternate long and short dashed-line arrow in FIGS. 5A and 5B to 8) is set to the forward direction of vehicle 2 and manipulation direction reference Bo (the dashed-line arrows in FIGS. 5A and 5B to 8) of remote operation terminal 32 is set to an upward manipulation direction (arrow Aa direction shown on suspended load movement manipulation tool 35 and terminal display apparatus 40) when facing the operating face of main body part 33. It is assumed that, for correction angle θ1 and tilting angle θ2, the left-hand direction from arrow Aa direction is defined as positive direction, the right-hand direction from arrow Aa direction is defined as negative direction, and the sign is used in adding or subtracting angles.

Figure 6:
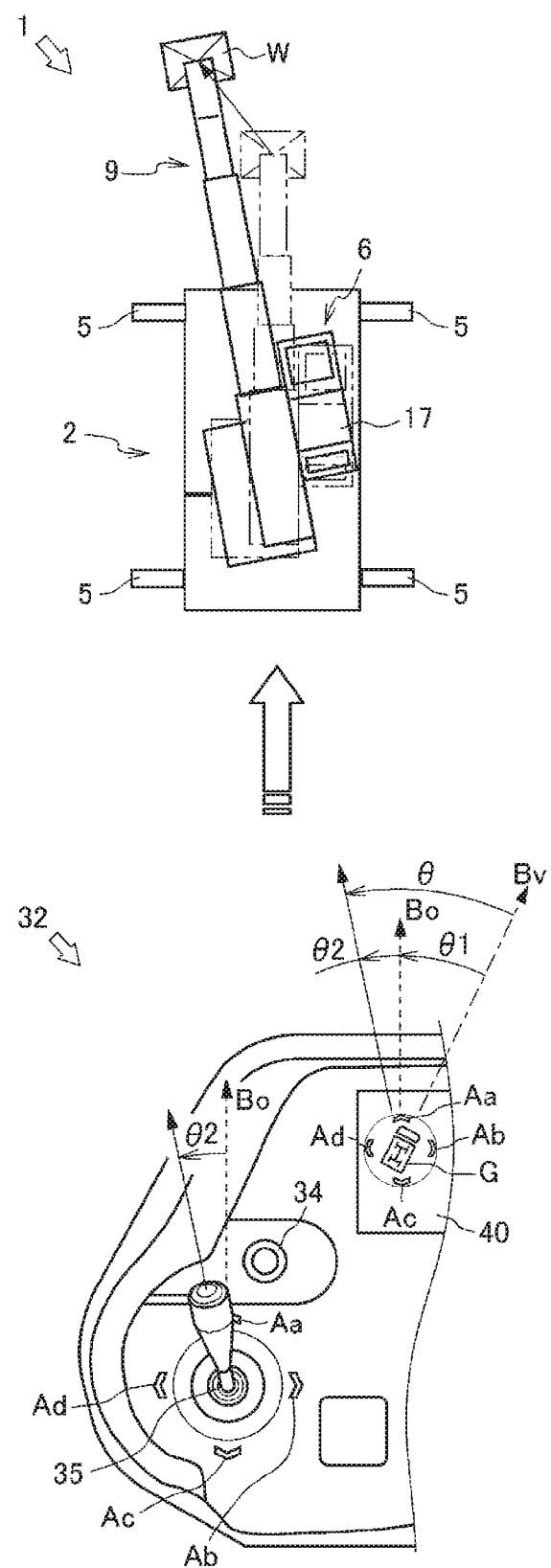
FIG. 6 is a schematic view illustrating the remote operation terminal in which the suspended load movement manipulation tool is manipulated and a state of movement of the crane resulting from the manipulation in Embodiment 1.

As shown in FIG. 6, when reference change manipulation tool 34 is manipulated to rotate by correction angle θ1 in the right-hand direction from vehicle direction reference By (see FIG. 5A) as a rotation position in which vehicle direction reference By and manipulation direction reference Bo do not coincide with each other, remote operation terminal 32 corrects manipulation direction reference Bo to the position rotated by correction angle θ1 in the left-hand direction that is the correction direction from vehicle direction reference Bv. In other words, for remote operation terminal 32, manipulation direction reference Bo is set to the position rotated by correction angle θ1 from vehicle direction reference By in the left-hand direction. At this time, on terminal display apparatus 40 of remote operation terminal 32, reference graphic G that schematically illustrates vehicle 2 of crane 1 and of which the forward direction is directed toward the direction of correction angle θ1 from arrow Aa that is manipulation direction reference Bo in the right-hand direction is shown.

When, for example, suspended load movement manipulation tool 35 of remote operation terminal 32 is manipulated to tilt by a selected tilting amount in the direction of the tilting angle θ2 in the left-hand direction from arrow Aa that is manipulation direction reference Bo as a tilting manipulation of suspended load movement manipulation tool 35 in a selected direction, terminal control apparatus 42 obtains, from the sensor (not shown) of suspended load movement manipulation tool 35, a manipulation signal on the tilting angle θ2 that is the angle from manipulation direction reference Bo to the tilting direction in the left-hand direction (positive direction) of the manipulation stick, and the tilting amount. In addition, terminal control apparatus 42 calculates a control signal to move load W in the movement direction of movement angle θ=correction angle θ1+tilting angle θ2 at a movement rate according to the tilting amount from the obtained manipulation signal and correction angle θ1 in the left-hand direction (positive direction), which is a correction amount of manipulation direction reference Bo from vehicle direction reference Bv. Remote operation terminal 32 generates control signals for associated swiveling valve 23, extension/retraction valve 24, luffing valve 25, main valve 26m, and sub valve 26s based on movement angle θ and the tilting amount, calculated in terminal control apparatus 42, and transmits the control signals to crane 1 by using terminal communication device 41.

Terminal control apparatus 42 does not execute a process of rotating manipulation direction reference Bo with respect to vehicle direction reference By at the time when a manipulation signal on a correction angle is obtained from reference change manipulation tool 34 while obtaining a manipulation signal on the tilting direction, tilting angle θ2 and the tilting amount of suspended load movement manipulation tool 35, that is, while generating a control signal for crane apparatus 6 to move load W.

Figure 7A:
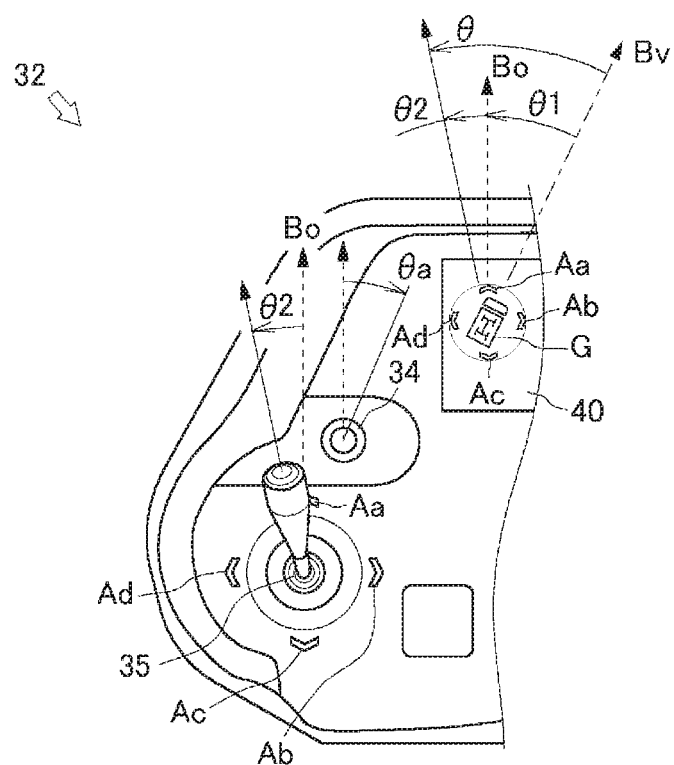
FIG. 7A is a partially enlarged view illustrating an manipulation direction reference when the reference change manipulation tool is manipulated in a state where the suspended load movement manipulation tool of the remote operation terminal is manipulated in Embodiment 1.

Even when, for example, reference change manipulation tool 34 is manipulated to rotate by angle θa in one direction as shown in FIG. 7A, terminal control apparatus 42 determines that the manipulation signal of reference change manipulation tool 34 is invalid and does not make correction to further rotate manipulation direction reference Bo by correction angle θa.

Terminal control apparatus 42 executes a process of rotating manipulation direction reference Bo with respect to vehicle direction reference By at the time when a manipulation signal on a correction angle is obtained from reference change manipulation tool 34 while not obtaining a manipulation signal on the tilting direction, tilting angle θ2 and the tilting amount of suspended load movement manipulation tool 35, that is, while not generating a control signal for crane apparatus 6 to move load W.

Figure 7B:
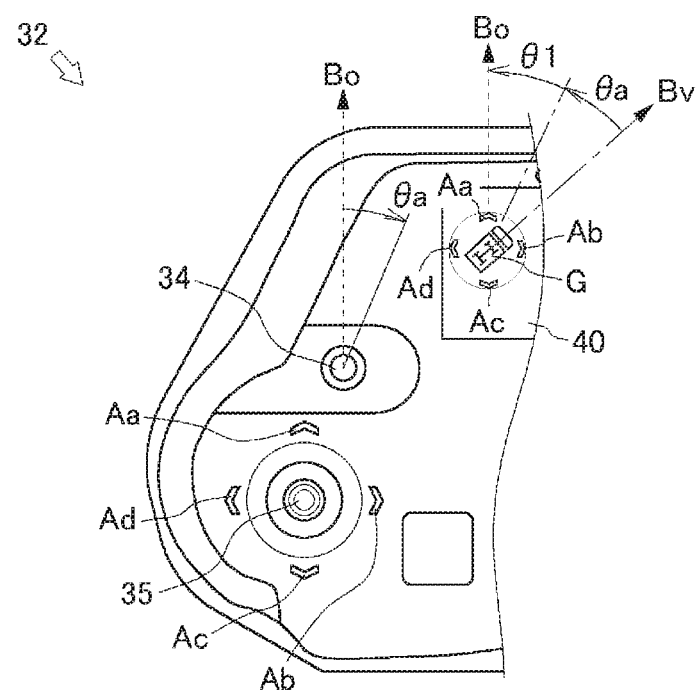
FIG. 7B is a partially enlarged view illustrating an manipulation direction reference when the reference change manipulation tool is manipulated in a state where the suspended load movement manipulation tool of the remote operation terminal is not manipulated in Embodiment 1.

When, for example, reference change manipulation tool 34 is manipulated to rotate by angle Ga in one direction as shown in FIG. 7B, terminal control apparatus 42 makes correction to further rotate manipulation direction reference Bo by correction angle θa based on the manipulation signal of reference change manipulation tool 34.

In the present embodiment, remote operation terminal 32 executes control to determine that a manipulation signal from reference change manipulation tool 34 is invalid while terminal control apparatus 42 is obtaining a manipulation signal of suspended load movement manipulation tool 35. Alternatively, a normally-closed contact (B contact) may be provided between reference change manipulation tool 34 and terminal control apparatus 42, and the contact may be cut off by manipulation of suspended load movement manipulation tool 35.

When crane 1 receives a control signal for movement angle θ and a movement rate, according to the tilting amount, of load W from remote operation terminal 32 as shown in FIG. 6, crane 1 moves load W at a rate according to the tilting amount in the direction of movement angle θ of load W from the forward direction of vehicle 2, which is vehicle direction reference By. Since suspended load movement manipulation tool 35 is tilted by a predetermined tilting amount at tilting angle θ2 from arrow Aa in the left-hand direction (positive direction), crane 1 moves load W in the direction of movement angle θ of load W=correction angle θ1+tilting angle θ2 in the left-hand direction (positive direction) from vehicle direction reference By at a conveyance rate corresponding to the tilting amount of suspended load movement manipulation tool 35. At this time, crane 1 controls hydraulic swivel motor 8, the hydraulic retraction cylinder, hydraulic luffing cylinder 12, the main hydraulic motor, and the like in accordance with a movement path of load W.

With such a configuration, in crane 1, an operator sets manipulation direction reference Bo of suspended load movement manipulation tool 35 to a selected angle with respect to vehicle direction reference By of work vehicle 2 with reference change manipulation tool 34 from remote operation terminal 32 without grasping a relative position of remote operation terminal 32 to crane apparatus 6. At this time, terminal display apparatus 40 of remote operation terminal 32 displays manipulation direction reference Bo with respect to vehicle direction reference Bv, so the operator more easily visually grasp the relation between vehicle direction reference By and manipulation direction reference Bo. Furthermore, remote operation terminal 32 is disabled to change manipulation direction reference Bo set to a selected direction with reference change manipulation tool 34 by manipulation of reference change manipulation tool 34 while suspended load movement manipulation tool 35 is being manipulated, so the operator does not lose the identified movement direction of crane apparatus 6 for the manipulation direction of suspended load movement manipulation tool 35. Thus, erroneous manipulation during remote operation of crane apparatus 6 is prevented, and it is possible to easily and simply perform remote operation of the work apparatus.

Embodiment 2

Next, crane 1 that is Embodiment 2 of the crane according to the present invention will be described with reference to FIGS. 8, 9A, and 9B. Cranes 1 according to the following embodiments are applied in placed of crane 1 illustrated in FIGS. 1 to 10A and 10B, so like names, reference numerals, and reference signs used in the above description denote the same components. In the following embodiments, the detailed description of the points similar to those of the already described embodiment is omitted, and differences will be mainly described.

Figure 8:
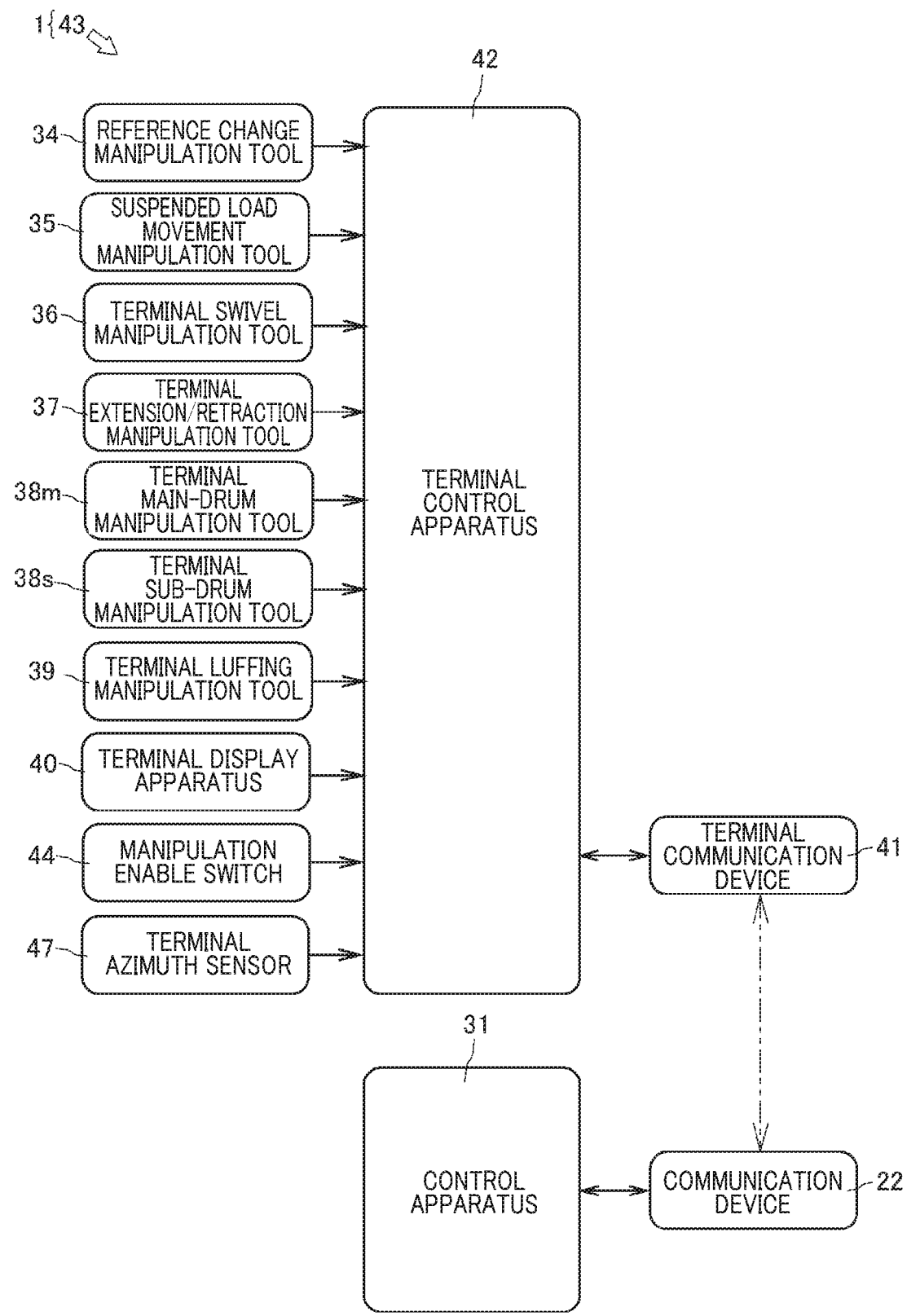
FIG. 8 is a block diagram illustrating the control configuration of a remote operation terminal in Embodiment 2.

As shown in FIG. 8, crane 1 includes remote operation terminal 43 that is capable of remotely operating crane apparatus 6. Remote operation terminal 43 is used in remotely operating crane 1. Remote operation terminal 43 includes manipulation enable switch 44 and the like in addition to main body part 33, suspended load movement manipulation tool 35 that is the first manipulation section and reference change manipulation tool 34 that is the second manipulation section, which are provided on the operating face of main body part 33.

Manipulation enable switch 44 enables transmission of control signals from terminal communication device 41 to swiveling valve 23, extension/retraction valve 24, luffing valve 25, main valve 26m, and sub valve 26s. Manipulation enable switch 44 is provided at a position where an operator is able to manipulate manipulation enable switch 44 at the time of manipulating suspended load movement manipulation tool 35 at the same time. Manipulation enable switch 44 is, for example, provided as a deadman switch at a position where an operator holds main body part 33 at the time of manipulating suspended load movement manipulation tool 35 on suspended load movement manipulation tool 35 side of main body part 33 (see FIGS. 9A and 9B). With such a configuration, remote operation terminal 43 enables transmission of a control signal from terminal communication device 41 when an operator intentionally manipulates suspended load movement manipulation tool 35, and does not transmit a control signal from terminal communication device 41 for manipulation of suspended load movement manipulation tool 35, not intended by the operator.

Terminal control apparatus 42 is connected to manipulation enable switch 44 and is capable of obtaining a manipulation signal of manipulation enable switch 44.

Figure 9A:
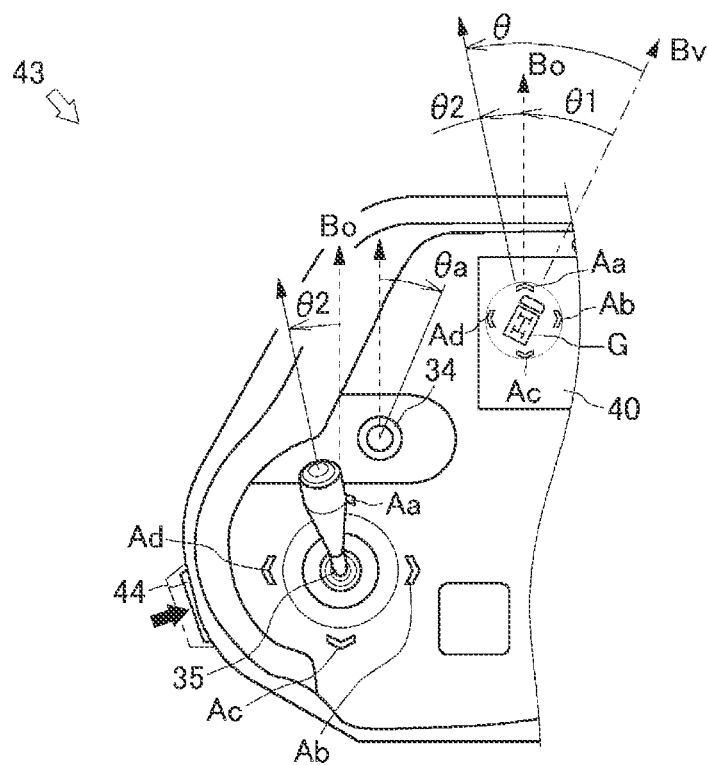
FIG. 9A is a partially enlarged view illustrating an manipulation direction reference when a reference change manipulation tool is manipulated in a state where a suspended load movement manipulation tool of the remote operation terminal is manipulated in Embodiment 2.

When suspended load movement manipulation tool 35 is manipulated to tilt by a selected tilting amount in the direction of tilting angle θ2, which is the left-hand direction, from arrow Aa that is manipulation direction reference Bo in a state where manipulation direction reference Bo is corrected to the position rotated by correction angle θ1 in the left-hand direction that is a correction direction from vehicle direction reference By as shown in FIG. 9A, terminal control apparatus 42 obtains a manipulation signal on tilting angle θ2 and the tilting amount from a sensor (not shown) of suspended load movement manipulation tool 35 and calculates a control signal to move load W at a movement rate according to the tilting amount in the movement direction of movement angle θ of load W=correction angle θ1+tilting angle θ2 from vehicle direction reference By. Remote operation terminal 43 generates control signals for associated swiveling valve 23, extension/retraction valve 24, luffing valve 25, main valve 26m, and sub valve 26s based on movement angle θ and the tilting amount, calculated in terminal control apparatus 42, and transmits the control signals to crane 1 by using terminal communication device 41.

Terminal control apparatus 42 transmits the calculated control signals from terminal communication device 41 (see FIG. 8) while obtaining a manipulation signal of manipulation enable switch 44, that is, while manipulation enable switch 44 is being manipulated (see the solid arrow). Terminal control apparatus 42, while obtaining a manipulation signal of manipulation enable switch 44, does not execute a process of rotating manipulation direction reference Bo with respect to vehicle direction reference By at the time when a manipulation signal for correction angle θ1 is obtained from reference change manipulation tool 34. Even when, for example, reference change manipulation tool 34 is manipulated to rotate by angle θa in one direction, terminal control apparatus 42 determines that the manipulation signal of reference change manipulation tool 34 is invalid and does not make correction to rotate manipulation direction reference Bo by correction angle θa.

Figure 9B:
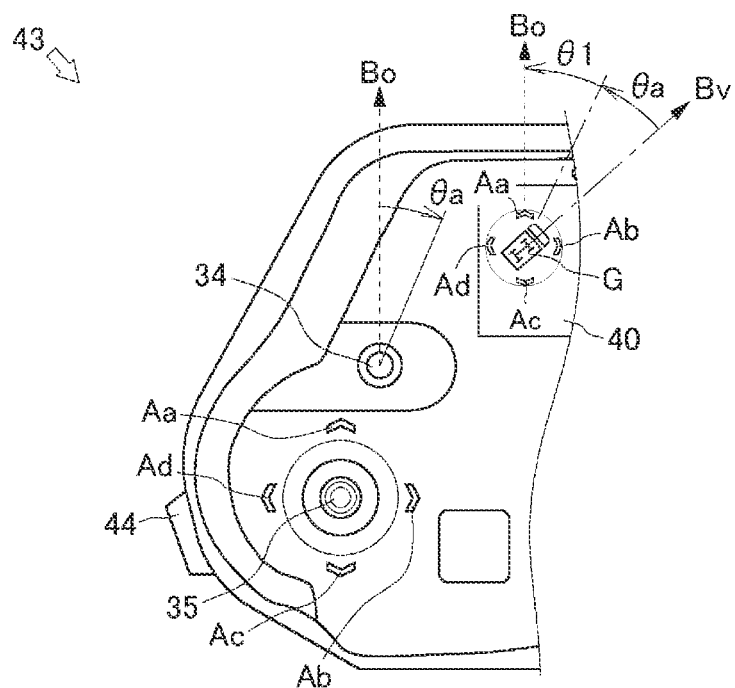
FIG. 9B is a partially enlarged view illustrating an manipulation direction reference when the reference change manipulation tool is manipulated in a state where the suspended load movement manipulation tool of the remote operation terminal is not manipulated in Embodiment 2.

As shown in FIG. 9B, while terminal control apparatus 42 is not obtaining a manipulation signal of manipulation enable switch 44, that is, while manipulation enable switch 44 is not being manipulated, terminal control apparatus 42 executes a process of rotating manipulation direction reference Bo with respect to vehicle direction reference By at the time when a manipulation signal for correction angle θ1 is obtained from reference change manipulation tool 34. When, for example, reference change manipulation tool 34 is manipulated to rotate by angle θa in one direction, terminal control apparatus 42 makes correction to further rotate manipulation direction reference Bo by correction angle θa based on the manipulation signal of reference change manipulation tool 34.

With such a configuration, only while manipulation enable switch 44 that functions as the deadman switch for suspended load movement manipulation tool 35 is being manipulated, crane 1 not only receives a control signal from remote operation terminal 43 but also does not allow a change of the reference of the movement direction of crane apparatus 6 during manipulation of manipulation enable switch 44. In other words, remote operation terminal 43 not only prevents movement of crane apparatus 6 resulting from manipulation not intended by an operator but also avoids a loss of the identified movement direction of crane apparatus 6 for the manipulation direction of suspended load movement manipulation tool 35. Thus, erroneous manipulation during remote operation of crane apparatus 6 is prevented, and it is possible to easily and simply perform remote operation of the crane apparatus 6.

Embodiment 3

Next, crane 1 that is Embodiment 3 of the crane according to the present invention will be described with reference to FIGS. 2, 4, 10A, 10B, and 11. Crane 1 includes remote operation terminal 45 that is capable of remotely operating crane apparatus 6.

As shown in FIGS. 2 and 4, vehicle 2 of crane 1 and remote operation terminal 45 are respectively provided with vehicle azimuth sensor 46 and terminal azimuth sensor 47 that are a reference setting section that automatically sets the reference of the movement direction of crane apparatus 6. Vehicle azimuth sensor 46 and terminal azimuth sensor 47 each are made up of a triaxial azimuth sensor. Vehicle azimuth sensor 46 and terminal azimuth sensor 47 each calculate an absolute azimuth by detecting terrestrial magnetism. Vehicle azimuth sensor 46 is configured to calculate an azimuth with reference to the forward direction of vehicle 2. Terminal azimuth sensor 47 is configured to calculate an azimuth with reference to the upward direction when facing the operating face of main body part 33 of remote operation terminal 45.

Control apparatus 31 is connected to vehicle azimuth sensor 46 and is capable of obtaining an azimuth signal of the forward direction of vehicle 2. Terminal control apparatus 42 is connected to terminal azimuth sensor 47 and is capable of obtaining an upward azimuth signal toward the operating face of main body part 33 of remote operation terminal 45. Terminal control apparatus 42 is also capable of obtaining a forward azimuth signal of vehicle 2 via terminal communication device 41.

Figure 10A:
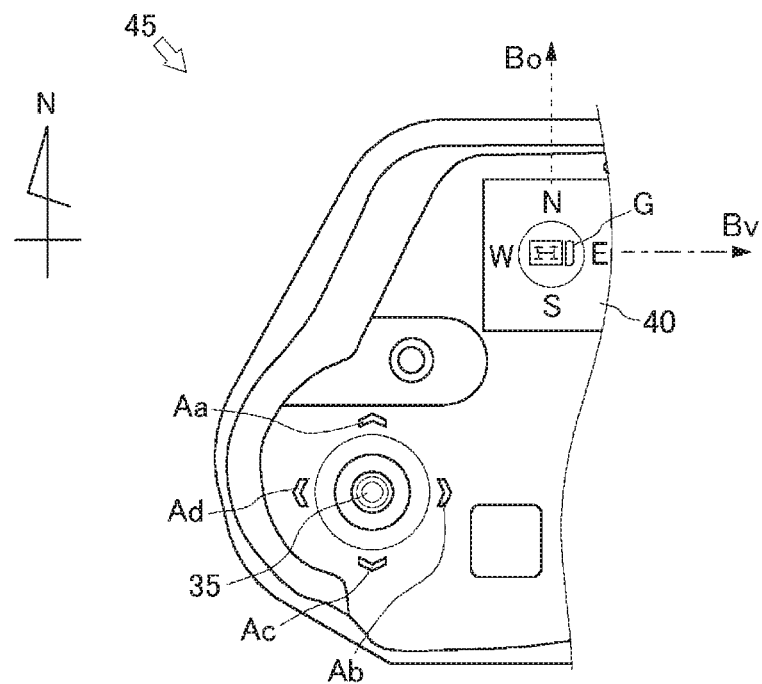
FIG. 10A is a partially enlarged view illustrating a state of display of a vehicle direction reference that is displayed on the remote operation terminal in a selected azimuth in Embodiment 3.
Figure 10B:
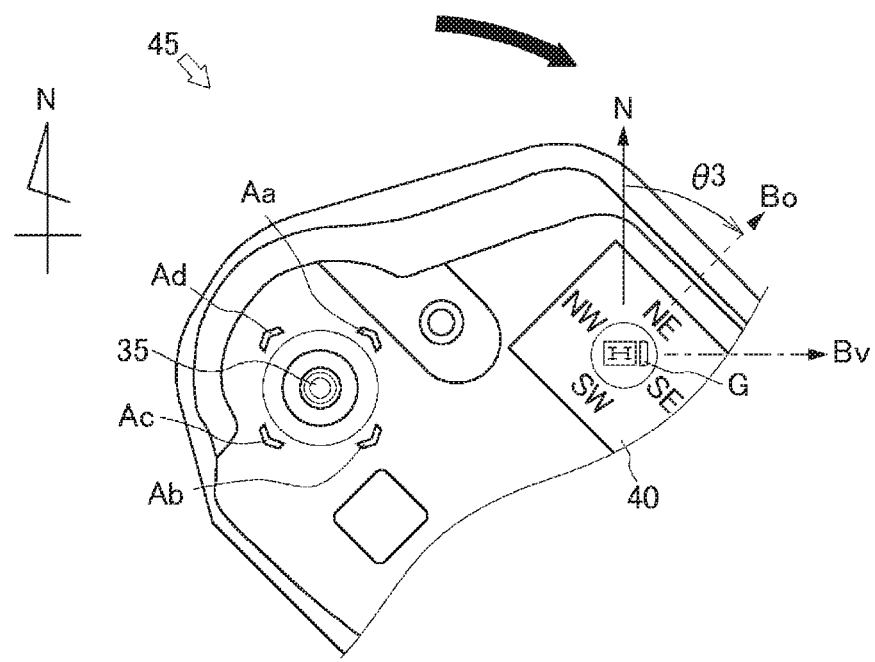
FIG. 10B is a partially enlarged view illustrating a state of display of the vehicle direction reference when the azimuth of the remote operation terminal is changed in Embodiment 3.

As shown in FIG. 10A and FIG. 10B, terminal display apparatus 40 displays various pieces of information. An image illustrating the azimuth of remote operation terminal 45 with reference to the upward direction when facing the operating face of main body part 33 is displayed on terminal display apparatus 40. In addition, reference graphic G schematically illustrating vehicle 2 of crane 1 is displayed based on an azimuth signal from vehicle azimuth sensor 46 of vehicle 2 on terminal display apparatus 40. In other words, reference graphic G is displayed such that the azimuth of the forward direction of vehicle 2 and the azimuth displayed on terminal display apparatus 40 coincide with each other. In other words, terminal control apparatus 42 displays reference graphic G on terminal display apparatus 40 in synchronization with the azimuth in the forward direction of vehicle 2, obtained via terminal communication device 41.

As shown in FIG. 10A, in a state where vehicle 2 is oriented to the east and manipulation direction reference Bo that is the upward direction when facing the operating face of main body part 33 of remote operation terminal 45 is oriented to the north, "N" indicating the north, "E" indicating the east, "S" indicating the south, and "W" indicating the west are displayed around reference graphic G on terminal display apparatus 40. Reference graphic G is displayed in a state where the forward direction is oriented in the "E" direction.

When remote operation terminal 45 is manipulated to rotate by 45° as correction angle θ3 toward the east side as shown in FIG. 10B, terminal control apparatus 42 obtains an azimuth signal from terminal azimuth sensor 47, rotated by 45° from the north direction toward the east that is a correction direction and corrects manipulation direction reference Bo to the north east. At this time, "NE" indicating the north east is displayed at the upper position when facing the operating face of main body part 33, which is manipulation direction reference Bo, on terminal display apparatus 40 of remote operation terminal 45, and "SE" indicating the south east, "SW" indicating the south west, and "NW" indicating the north west are respectively displayed at associated positions. The forward direction of reference graphic G is displayed so as to be oriented to the east that is the direction of correction angle θ3 ("E" direction in FIG. 10A) on the east side of manipulation direction reference Bo. In this way, remote operation terminal 45 is configured to automatically set manipulation direction reference Bo by using vehicle azimuth sensor 46 and terminal azimuth sensor 47.

Figure 11:
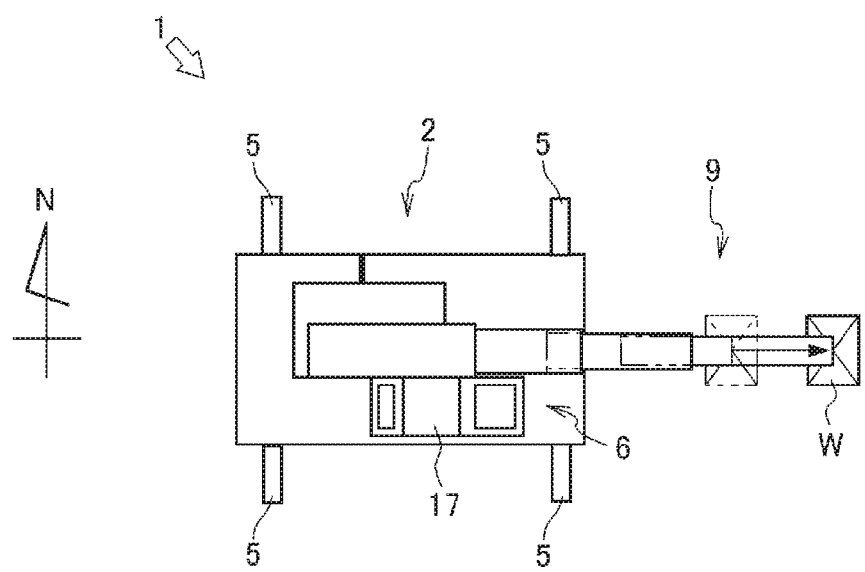
FIG. 11 is a schematic view illustrating a manipulation direction reference and a state of movement of the crane when the direction of the remote operation terminal of which a suspended load movement manipulation tool is manipulated is changed in Embodiment 3.
Figure 11:
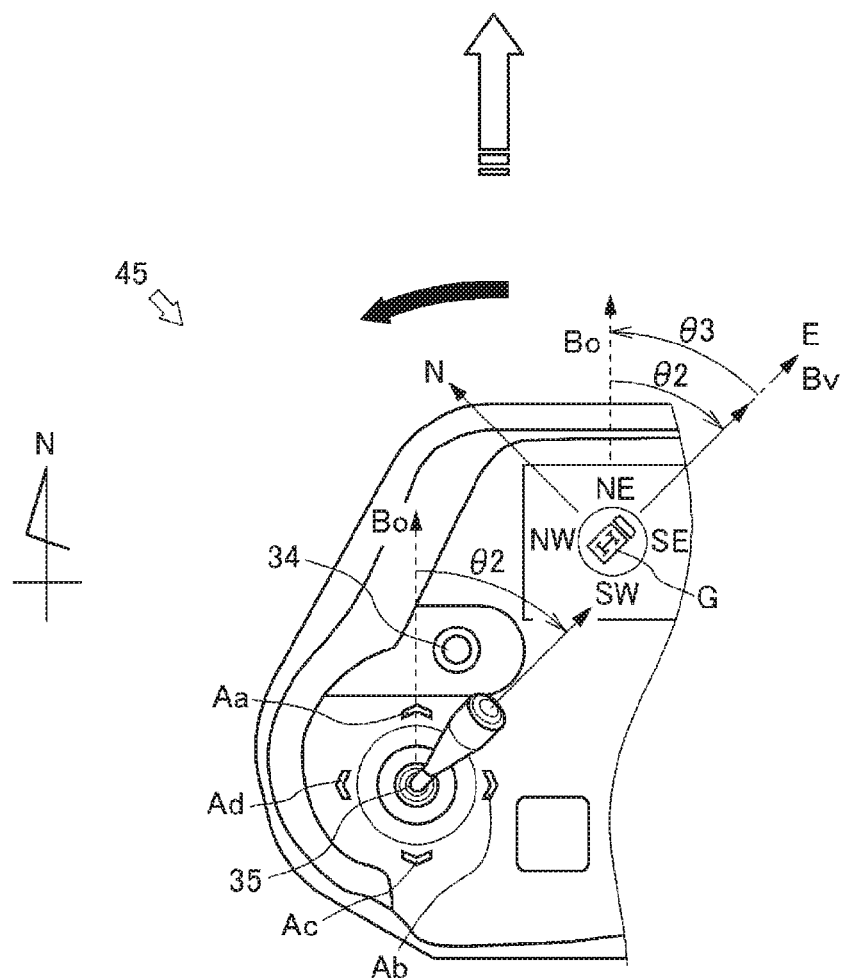

As shown in FIG. 11, it is assumed that, in a state where remote operation terminal 45 is manipulated to rotate by 45° as correction angle 63 toward the east side suspended load movement manipulation tool 35 is manipulated to tilt by a selected tilting amount in the direction of 45° as tilting angle θ2 from the north east direction that is manipulation direction reference Bo to the east side as tilting manipulation of suspended load movement manipulation tool 35 in a selected direction. Remote operation terminal 45 obtains, from a sensor (not shown) of suspended load movement manipulation tool 35, a manipulation signal on a tilting amount and tilting angle 62 toward the east, which is an azimuth of 45° from the north east toward the east. Then, because the calculated azimuth of the tilting manipulation coincides with the east that is the azimuth of vehicle direction reference By, remote operation terminal 45 calculates movement angle θ of load W with respect to vehicle 2 as the forward direction of vehicle 2. Remote operation terminal 45 calculates a control signal for moving load W by movement angle θ at a movement rate according to the tilting amount. Remote operation terminal 45 generates control signals for swiveling valve 23, extension/retraction valve 24, luffing valve 25, main valve 26m, and sub valve 26s and transmits the control signals to crane 1 with terminal communication device 41.

Terminal control apparatus 42 locks manipulation direction reference Bo determined from the azimuth of remote operation terminal 45 at the time when a manipulation signal is obtained from suspended load movement manipulation tool 35 while obtaining a manipulation signal on the tilting direction, tilting angle θ2, and the tilting amount of suspended load movement manipulation tool 35, that is, while generating a control signal for crane apparatus 6 to move load W. In other words, terminal control apparatus 42 does not execute a process of rotating manipulation direction reference Bo based on an azimuth signal from terminal azimuth sensor 47. Even when, for example, remote operation terminal 45 is rotated to the direction of correction angle $\theta 3$ in one direction (see the solid arrow), terminal control apparatus 42 determines that an azimuth signal from terminal azimuth sensor 47 is invalid and does not make correction to rotate manipulation direction reference Bo by correction angle $\theta 3$. In other words, remote operation terminal 45 is placed such that the upward direction is oriented to the north, and manipulation direction reference Bo is maintained in the north east direction. Terminal control apparatus 42 executes a process of rotating manipulation direction reference Bo with respect to vehicle direction reference By at the time when an azimuth signal on correction angle $\theta 3$ is obtained from terminal azimuth sensor 47 while not obtaining a manipulation signal on the tilting direction, tilting angle $\theta 2$ and the tilting amount of suspended load movement manipulation tool 35, that is, while not generating a control signal for crane apparatus 6 to move load W.

With such a configuration, in crane 1, while suspended load movement manipulation tool 35 is being manipulated, the reference of the movement direction of crane apparatus 6, which is automatically set with reference to an azimuth based on terrestrial magnetism from vehicle azimuth sensor 46 and terminal azimuth sensor 47, is not changed. In other words, remote operation terminal 45 prevents a variation in correction angle 63, not intended by an operator during operation, and avoids a loss of the identified movement direction of crane apparatus 6 for the manipulation direction of suspended load movement manipulation tool 35. Thus, erroneous manipulation during remote operation of crane apparatus 6 is prevented, and it is possible to easily and simply perform remote operation of the crane apparatus 6.

Next, a mode of display of video image i of load W by means of camera 9b will be described with reference to FIGS. 12A, 12B, and 13. Crane 1 is capable of causing terminal display apparatus 40 of remote operation terminal 32, remote operation terminal 43, or remote operation terminal 45 to display video image i from camera 9b provided at the distal end portion of boom 9.

Terminal control apparatus 42 (see FIG. 16) of remote operation terminal 32, remote operation terminal 43, or remote operation terminal 45 is capable of obtaining video image i taken by camera 9b via terminal communication device 41. Terminal control apparatus 42 is also capable of displaying positioning mark Ma in the obtained image (see FIGS. 12A and 12B). Terminal control apparatus 42 is capable of rotating obtained video image i in accordance with a manipulation signal of reference change manipulation tool 34 and causing terminal display apparatus 40 to display video image i (see FIGS. 12A and 12B). Terminal control apparatus 42 is capable of displaying movement mark Mt in accordance with the obtained manipulation signal of suspended load movement manipulation tool 35 (see FIG. 13).

Figure 12A:
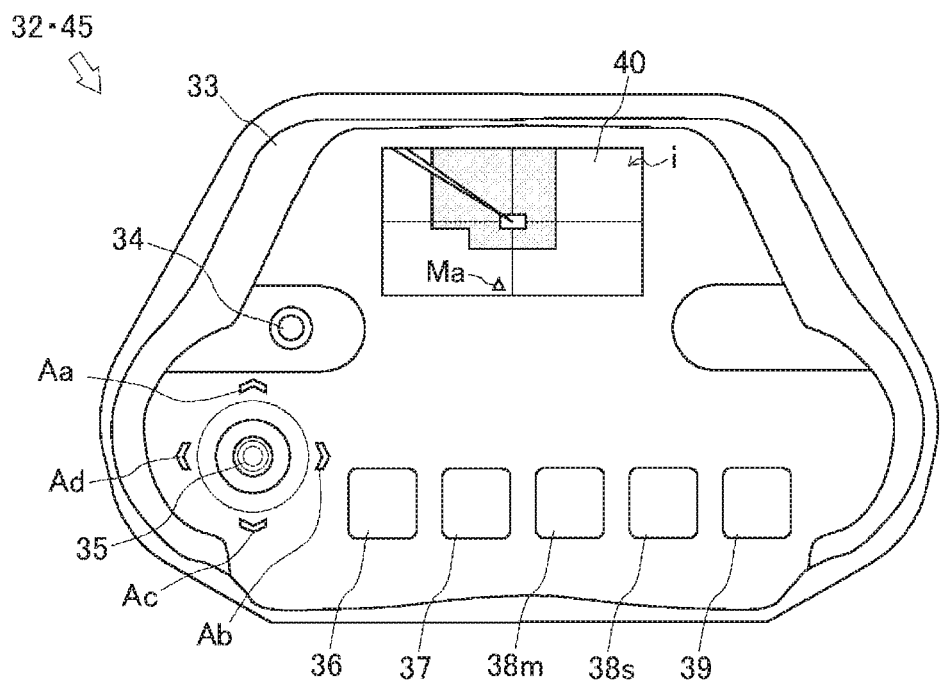
FIG. 12A is an enlarged view illustrating a video image from a camera, displayed on the remote operation terminal, in Embodiment 1 and Embodiment 2.

As shown in FIG. 12A, video image i from vertically above load W, which is being taken by camera 9b, is displayed on terminal display apparatus 40. Video image i contains video image i in a predetermined area about load W. In addition to video image i in a predetermined area about load W, positioning mark Ma (triangle mark in the present embodiment) indicating a positioned direction of vehicle 2 or crane apparatus 6 is shown on terminal display apparatus 40. Thus, an operator is able to constantly grasp the positioned direction of vehicle 2 or crane apparatus 6 from load W on video image i regardless of the orientation of camera 9b with respect to vehicle 2 or crane apparatus 6. The frame shape of video image i to be displayed on terminal display apparatus 40 may be rectangular or circular.

Furthermore, in addition to video image i in a predetermined area about load W, movement mark Mt (solid arrow in FIG. 13) indicating the movement direction and the movement rate of load W may be displayed on terminal display apparatus 40 in accordance with the tilting direction of suspended load movement manipulation tool 35. Thus, an operator is able to constantly grasp the movement direction of load W on video image i regardless of the orientation of camera 9b with respect to vehicle 2 or crane apparatus 6.

Terminal control apparatus 42 of remote operation terminal 32, remote operation terminal 43, or remote operation terminal 45 is capable of obtaining video image i taken by camera 9b via terminal communication device 41. Terminal control apparatus 42 is also capable of displaying positioning mark Ma in the obtained image. Terminal control apparatus 42 is capable of rotating obtained video image i in accordance with a manipulation signal of reference change manipulation tool 34 and causing terminal display apparatus 40 to display the video image i. Terminal control apparatus 42 is capable of displaying movement mark Mt in accordance with the obtained manipulation signal of suspended load movement manipulation tool 35.

Figure 12B:
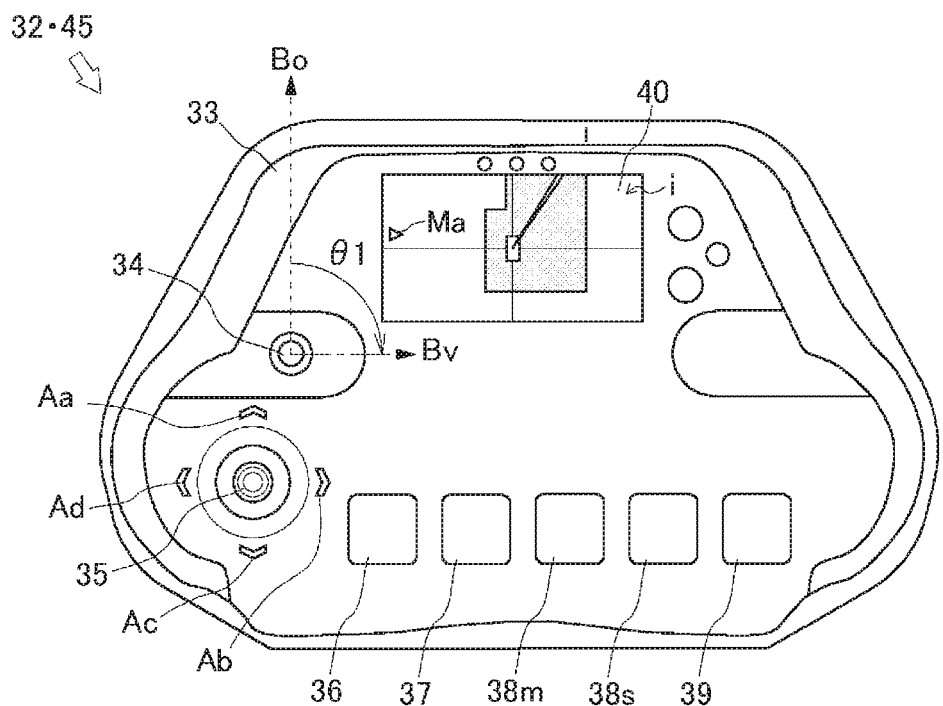
FIG. 12B is an enlarged view illustrating a video image from the camera, displayed on the remote operation terminal when the reference change manipulation tool of the remote operation terminal is manipulated in Embodiment 1 and Embodiment 2.

As shown in FIG. 12B, when terminal control apparatus 42 of remote operation terminal 32 or remote operation terminal 45 obtains a manipulation signal on the rotation direction that is the rotation position obtained from reference change manipulation tool 34 manipulated to rotate and correction angle $\theta 1$ that is the angle from vehicle direction reference By, terminal control apparatus 42 rotates video image i, displayed on terminal display apparatus 40, by correction angle $\theta 1$. When, for example, reference change manipulation tool 34 is manipulated to rotate from manipulation direction reference Bo to the position of angle $\theta 1$ in one direction (right-hand direction in FIG. 5A), terminal control apparatus 42 rotates video image i and positioning mark Ma by correction angle $\theta 1$ in one direction and causes terminal display apparatus 40 to display video image i and positioning mark Ma. For remote operation terminal 43 as well, video image i is processed to rotate by rotation of remote operation terminal 43 itself.

Figure 13:
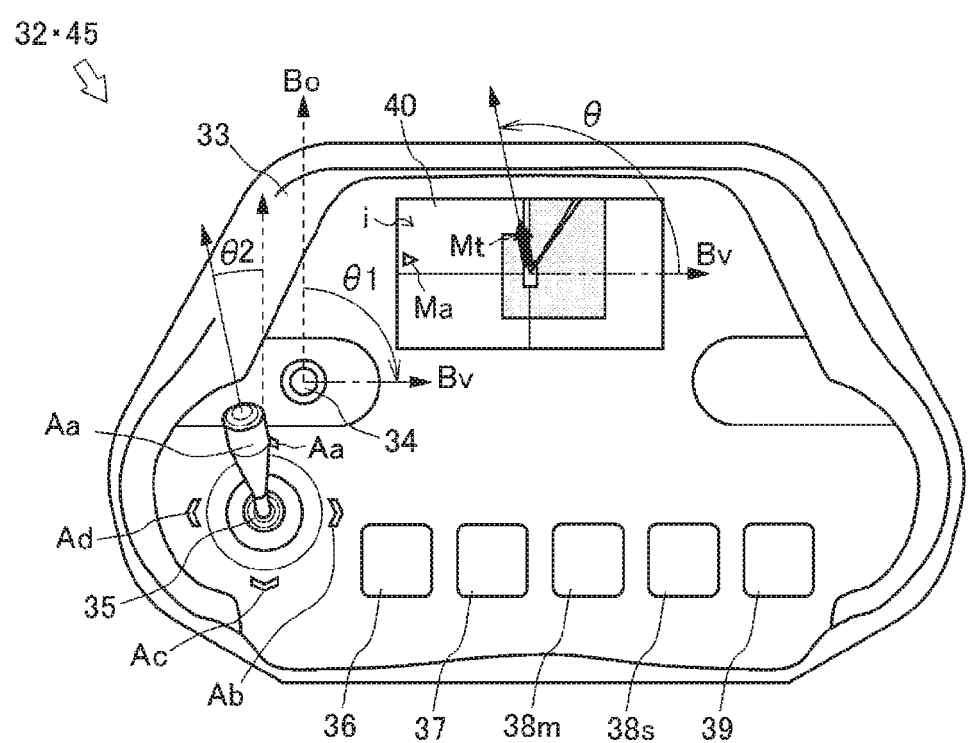
FIG. 13 is an enlarged view illustrating a conveyance direction of a load when the suspended load movement manipulation tool is manipulated in Embodiment 1 and Embodiment 2.
Figure 14:
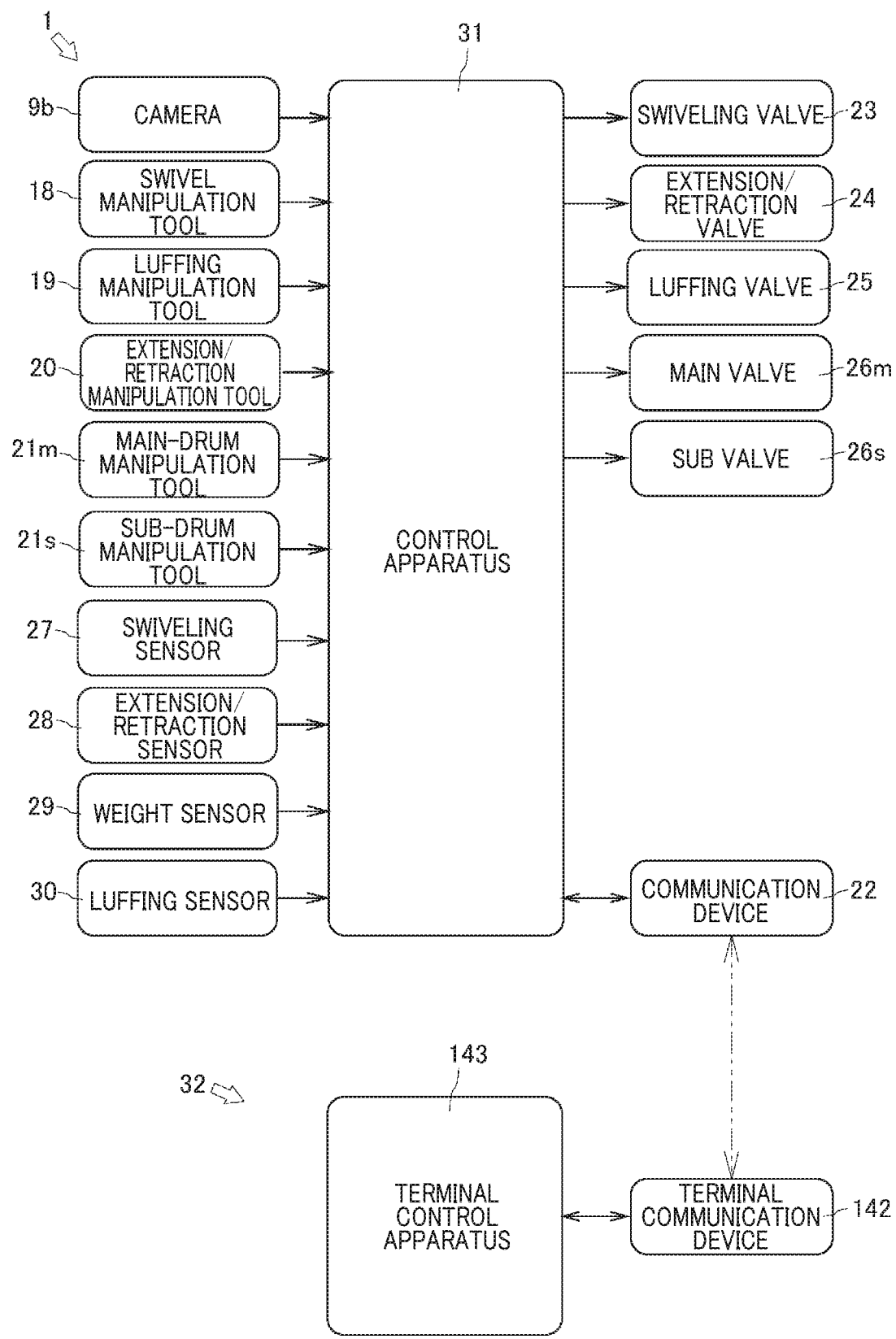
FIG. 14 is a block diagram illustrating the control configuration of a crane in Embodiment 4.

As shown in FIG. 13, when terminal control apparatus 42 of remote operation terminal 32 or remote operation terminal 45 obtains a manipulation signal on tilting angle $\theta 2$, which is the angle from manipulation direction reference Bo to the tilting direction of the manipulation stick, the tilting direction, and the tilting amount, obtained from suspended load movement manipulation tool 35, terminal control apparatus 42 causes terminal display apparatus 40 to display an arrow that points the movement direction of load W as movement mark Mt in size according to the movement rate of load W. When, for example, suspended load movement manipulation tool 35 is manipulated to tilt by tilting angle $\theta 2$ to one of the right and left sides of manipulation direction reference Bo, terminal control apparatus 42 displays movement mark Mt that indicates the movement angle $\theta$ of load W with respect to vehicle direction reference By and the movement rate, calculated from correction angle $\theta 1$ and its correction direction, set by reference change manipulation tool 34, and tilting angle $\theta 2$.

Terminal control apparatus 42 of remote operation terminal 32, remote operation terminal 43, or remote operation terminal 45 does not execute a process of rotating video image i and positioning mark Ma at the time when a manipulation signal on correction angle θ1 is obtained from reference change manipulation tool 34 while obtaining a manipulation signal on the tilting direction, tilting angle θ2 and the tilting amount of suspended load movement manipulation tool 35, that is, while generating a control signal for crane apparatus 6 to move load W.

With such a configuration, an operator constantly identifies the positioned direction of crane 1 in video image i with positioning mark Ma and constantly identifies the movement direction and the movement rate of load W with movement mark Mt, so the operator easily grasps the positional relation among crane 1, load W, and its surroundings. Thus, in crane 1, it is possible to easily and simply perform remote operation of crane apparatus 6.

Embodiment 4

Next, crane 1 that is Embodiment 4 of the crane according to the present invention will be described with reference to FIGS. 14 to 24A and 24B.

Next, remote operation terminal 32 will be described with reference to FIGS. 15 to 17A and 17B.

Figure 15:
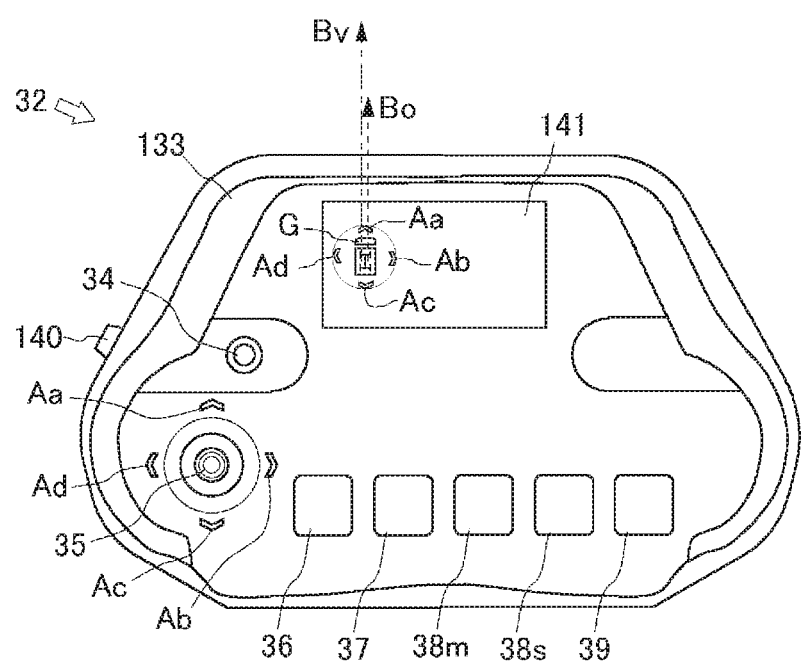
FIG. 15 is a plan view illustrating the schematic configuration of a remote operation terminal in Embodiment 4.

As shown in FIG. 15, remote operation terminal 32 is used in remotely operating crane 1. Remote operation terminal 32 includes case 133, suspended load movement manipulation tool 35 that is the first manipulation section provided on an operating face of case 133, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, reference change enable switch 140 that is the second manipulation section, display apparatus 141, terminal communication device 142, terminal control apparatus 143 (see FIGS. 14 and 16), and the like. Remote operation terminal 32 sets manipulation direction reference Bo with reference change manipulation tool 34 and transmits control signals for the control valves of the actuators for moving load W by manipulation of suspended load movement manipulation tool 35 or various manipulation tools to crane apparatus 6.

Manipulation direction reference Bo of remote operation terminal 32 is a reference for setting the movement direction of load W to be moved by tilting manipulation of suspended load movement manipulation tool 35 in a selected direction with respect to vehicle 2 (vehicle direction reference Bv). Specifically, manipulation direction reference Bo is a reference for setting correction angle θ1 for correcting the movement direction of load W (the movement direction of crane apparatus 6) that moves as a result of tilting manipulation of suspended load movement manipulation tool 35 in a selected direction with respect to vehicle direction reference By that is the reference of vehicle 2. In the present embodiment, vehicle direction reference By is set to a forward direction that is a forward travel direction of vehicle 2 (see the alternate long and short dashed-line arrow), and manipulation direction reference Bo of remote operation terminal 32 is set to an upward direction (see the dashed-line arrow) when facing the operating face of case 133.

Case 133 is a main component member of remote operation terminal 32. Case 133 has such a size that an operator is able to hold by hand. Case 133 is provided on its operating face with suspended load movement manipulation tool 35, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, reference change enable switch 140, display apparatus 141, and terminal communication device 142 (see FIGS. 14 and 16).

Reference change manipulation tool 34 receives an instruction to change the position of manipulation direction reference Bo with respect to vehicle direction reference Bv. Reference change manipulation tool 34 is made up of a rotary knob protruding from the operating face of case 133 and a sensor (not illustrated) that detects the rotation direction and the rotation amount, that is, the rotation position of the rotary knob. Reference change manipulation tool 34 is configured such that the rotary knob can be manipulated to rotate in a selected direction. Reference change manipulation tool 34 is configured to transmit, to terminal control apparatus 143, a signal on correction angle θ1 (see FIG. 17A) that is the angle from vehicle direction reference By to manipulation direction reference Bo by using the rotation position of the rotary knob.

Suspended load movement manipulation tool 35 that is the first manipulation section receives an instruction to move load W at a selected rate in a selected direction in a selected horizontal plane. Suspended load movement manipulation tool 35 is made up of a manipulation stick upright substantially vertically from the operating face of case 133 and a sensor (not illustrated) that detects the tilting direction and the tilting amount of the manipulation stick. Suspended load movement manipulation tool 35 is configured such that the manipulation stick can be manipulated to tilt in a selected direction. Suspended load movement manipulation tool 35 is configured to transmit, to terminal control apparatus 143, a signal on tilting angle θ2 (see FIG. 17B) between the tilting direction of the manipulation stick, detected by the sensor, and manipulation direction reference Bo and its tilting amount. Furthermore, suspended load movement manipulation tool 35 is configured to transmit, to terminal control apparatus 143, a manipulation signal on the tilting direction of the manipulation stick, of which the tilting direction is changed, and its manipulation angle θ3 after reference change enable switch 140 is manipulated. Arrow Aa indicating an upward direction when facing the operating face of case 133, arrow Ab indicating a right-hand direction when facing the operating face, arrow Ac indicating a downward direction when facing the operating face, and arrow Ad indicating a left-hand direction when facing the operating face are shown on suspended load movement manipulation tool 35 as a guide for tilting angle θ2 and manipulation angle θ3 of suspended load movement manipulation tool 35.

Terminal swivel manipulation tool 36 receives an instruction to swivel crane apparatus 6 at a selected movement rate in a selected movement direction. Terminal swivel manipulation tool 36 is made up of a manipulation stick upright substantially vertically from the operating face of case 133 and a sensor (not illustrated) that detects the tilting direction and the tilting amount of the manipulation stick. Terminal swivel manipulation tool 36 is configured to be able to tilt in each of a direction to provide an instruction to swivel to the left and a direction to provide an instruction to swivel to the right.

Terminal extension/retraction manipulation tool 37 receives an instruction to extend or retract boom 9 at a selected rate. Terminal extension/retraction manipulation tool 37 is made up of a manipulation stick upright from the operating face of case 133 and a sensor (not illustrated) that detects the tilting direction and the tilting amount of the manipulation stick. Terminal extension/retraction manipulation tool 37 is configured to be able to tilt in each of a direction to provide an instruction to extend and a direction to provide an instruction to retract.

Terminal main-drum manipulation tool 38m receives an instruction to rotate main winch 13 at a selected rate in a selected direction. Terminal main-drum manipulation tool 38m is made up of a manipulation stick upright from the operating face of case 133 and a sensor (not illustrated) that detects the tilting direction and the tilting amount of the manipulation stick. Terminal main-drum manipulation tool 38m is configured to be able to tilt in each of a direction to provide an instruction to wind up main wire rope 14 and a direction to provide an instruction to feed out main wire rope 14. Terminal sub-drum manipulation tool 38s is also similarly configured.

Terminal luffing manipulation tool 39 receives an instruction to luff up or down boom 9 at a selected rate. Terminal luffing manipulation tool 39 is made up of a manipulation stick upright from the operating face of case 133 and a sensor (not illustrated) that detects the tilting direction and the tilting amount of the manipulation stick. Terminal luffing manipulation tool 39 is configured to be able to tilt in each of a direction to provide an instruction to luff up and a direction to provide an instruction to luff down.

Reference change enable switch 140 that is the second manipulation section receives an instruction to enable a change of manipulation direction reference Bo. Reference change enable switch 140 is provided at a position on the operating face of remote operation terminal 32 where it is possible to manipulate reference change enable switch 140 during manipulation of suspended load movement manipulation tool 35 at the same time. Reference change enable switch 140 is provided, for example, at a position on the side face of case 133 where an operator is able to manipulate reference change enable switch 140 during manipulation of suspended load movement manipulation tool 35. Reference change enable switch 140 is configured such that a manipulation signal is transmitted to terminal control apparatus 143.

Display apparatus 141 displays various pieces of information, such as information on the attitude of crane 1 and information on load W. Display apparatus 141 is made up of an image display apparatus, such as a liquid crystal screen. Display apparatus 141 is provided on the operating face of case 133. Reference graphic G that schematically illustrates vehicle 2 of crane 1 is displayed on display apparatus 141 as an image indicating the orientation of manipulation direction reference Bo of remote operation terminal 32. Reference graphic G is drawn so that vehicle direction reference By of vehicle 2 can be identified. Reference graphic G is rotated in synchronization with the rotation position of reference change manipulation tool 34. In other words, the relative positional relation between manipulation direction reference Bo (see the continuous-line arrow) that reflects the rotation direction and rotation amount of reference change manipulation tool 34 and vehicle direction reference By (see the alternate long and two-short dashed-line arrow) is displayed on display apparatus 141.

Arrow Aa indicating an upward direction when facing the operating face of case 133, arrow Ab indicating a right-hand direction when facing the operating face, arrow Ac indicating a downward direction when facing the operating face, and arrow Ad indicating a left-hand direction when facing the operating face are shown on display apparatus 141 as a guide for tilting angle θ2 of suspended load movement manipulation tool 35, so as to surround reference graphic G.

Figure 16:
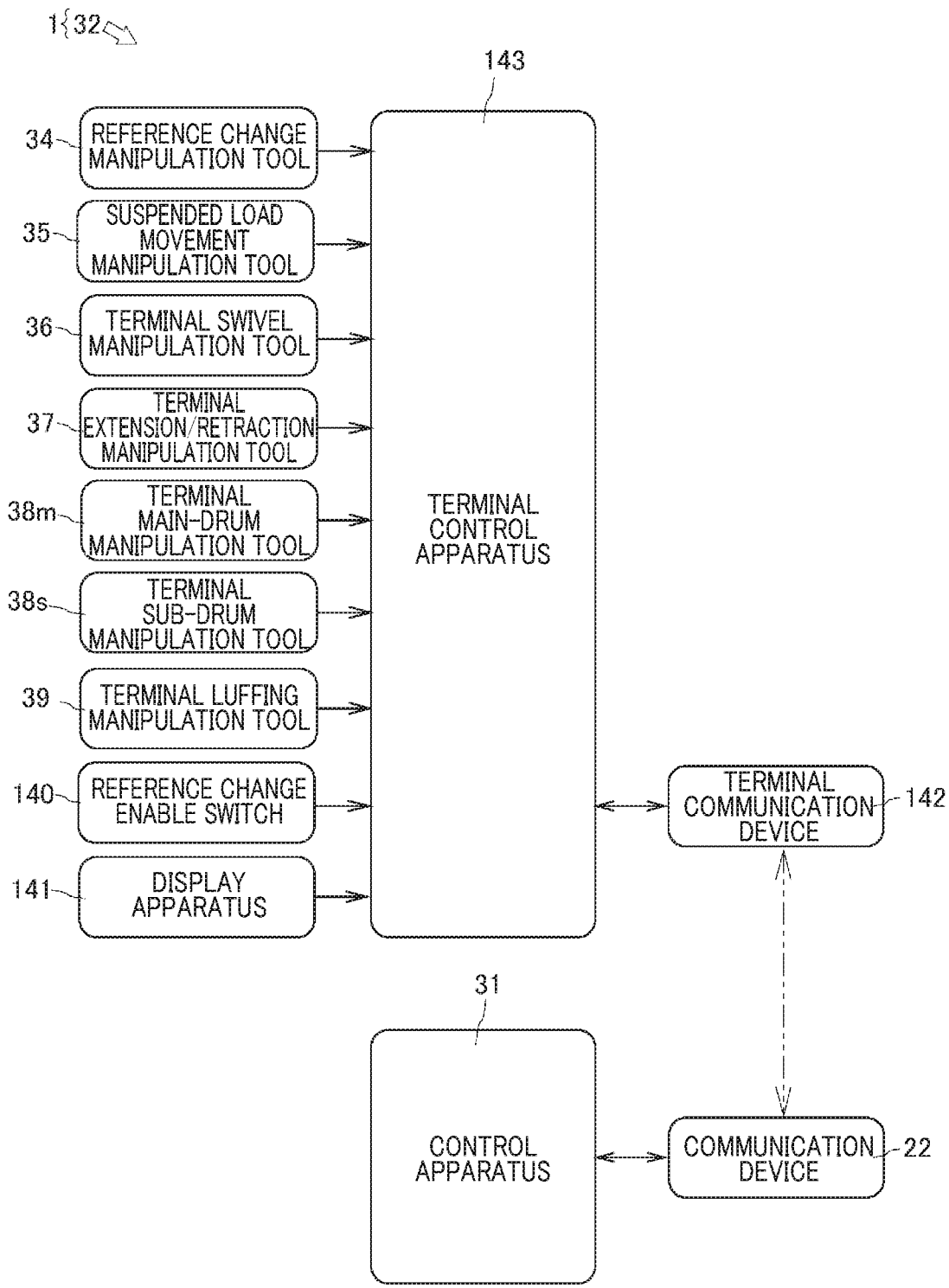
FIG. 16 is a block diagram illustrating the control configuration of the remote operation terminal in Embodiment 4.

As shown in FIG. 16, terminal communication device 142 receives control information and the like of crane apparatus 6 and transmits control information and the like from remote operation terminal 32. Terminal communication device 142 is provided inside case 133. Terminal communication device 142 is configured to, when terminal communication device 142 receives video image i, a control signal, or the like from crane apparatus 6, transmit video image i, the control signal, or the like to terminal control apparatus 143. Terminal communication device 142 is also configured to transmit control information from terminal control apparatus 143 to crane apparatus 6 of crane 1.

Terminal control apparatus 143 that is a control section controls remote operation terminal 32. Terminal control apparatus 143 is provided inside case 133 of remote operation terminal 32. Substantively, terminal control apparatus 143 may be made up of a CPU, ROM, RAM, HDD, and the like connected to one another via a bus or may be made up of a one-chip LSI or the like. Terminal control apparatus 143 stores various programs and data in order to control the operations of suspended load movement manipulation tool 35, reference change manipulation tool 34, terminal swivel manipulation tool 36, terminal extension/retraction manipulation tool 37, terminal main-drum manipulation tool 38m, terminal sub-drum manipulation tool 38s, terminal luffing manipulation tool 39, reference change enable switch 140, display apparatus 141, terminal communication device 142, and the like.

Terminal control apparatus 143 is connected to suspended load movement manipulation tool 35, terminal swivel manipulation tool 36, terminal extension/retraction manipulation tool 37, terminal main-drum manipulation tool 38m, terminal sub-drum manipulation tool 38s, and terminal luffing manipulation tool 39 and is capable of obtaining a manipulation signal composed of the tilting direction and the tilting amount of the manipulation stick of each manipulation tool. Terminal control apparatus 143 is also connected to reference change manipulation tool 34 and is capable of obtaining a manipulation signal composed of the rotation direction and the rotation angle, that is, the rotation position of reference change manipulation tool 34. Terminal control apparatus 143 is connected to reference change enable switch 140 and is capable of obtaining a manipulation signal from reference change enable switch 140.

Terminal control apparatus 143 is capable of generating control signals from manipulation signals of the manipulation sticks, obtained from the sensors of terminal swivel manipulation tool 36, terminal extension/retraction manipulation tool 37, terminal main-drum manipulation tool 38m, terminal sub-drum manipulation tool 38s, and terminal luffing manipulation tool 39 for associated swiveling valve 23, extension/retraction valve 24, luffing valve 25, main valve 26m, and sub valve 26s.

Terminal control apparatus 143 is connected to display apparatus 141 and is capable of causing display apparatus 141 to display video image i and various pieces of information from crane apparatus 6. Terminal control apparatus 143 is capable of rotating and displaying reference graphic G (or reference coordinate axes) in synchronization with correction angle θ1 and a rotation direction obtained from the rotation position of the rotary knob of reference change manipulation tool 34. Terminal control apparatus 143 is connected to terminal communication device 142 and is capable of transmitting or receiving various pieces of information to or from communication device 22 of crane apparatus 6 via terminal communication device 142.

Figure 17A:
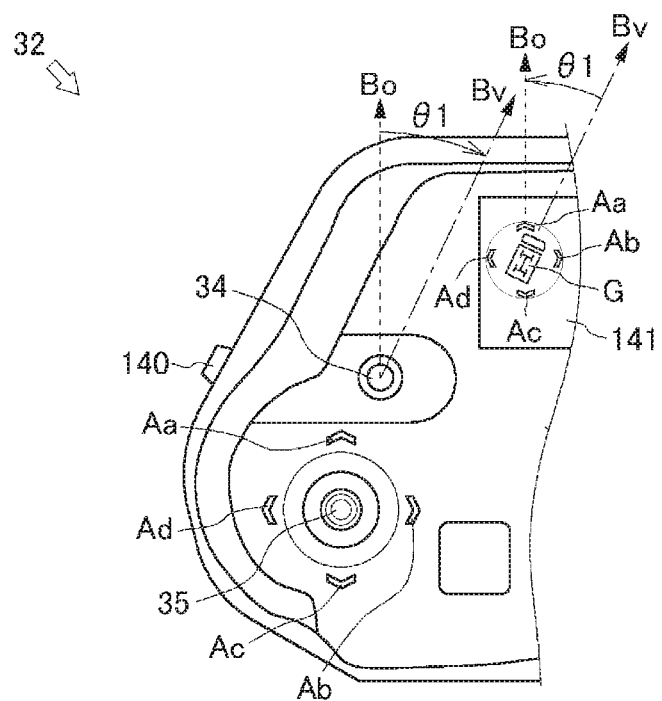
FIG. 17A is a partially enlarged view illustrating a manipulation direction reference when a reference change manipulation tool of the remote operation terminal is manipulated in Embodiment 4.

As shown in FIG. 17A, terminal control apparatus 143 (see FIG. 16) relatively rotates manipulation direction reference Bo with respect to vehicle direction reference By based on a manipulation signal on the rotation direction that is the rotation position obtained from reference change manipulation tool 34 manipulated to rotate and correction angle θ1 that is the angle from vehicle direction reference Bv. When, for example, reference change manipulation tool 34 is manipulated to rotate from manipulation direction reference Bo to a position of correction angle θ1 in one direction (in the clockwise direction in FIG. 17A), terminal control apparatus 143 corrects the direction of manipulation direction reference Bo by rotating manipulation direction reference Bo by correction angle θ1 in the other direction (in the counterclockwise direction in FIG. 17A) from vehicle direction reference By as a correction direction. At this time, terminal control apparatus 143 rotates reference graphic G displayed on display apparatus 141 to the position of correction angle θ1 in one direction (in the clockwise direction in FIG. 17A) from the upward direction of remote operation terminal 32, which is the direction of manipulation direction reference Bo, based on a manipulation signal on correction angle θ1 from reference change manipulation tool 34.

Figure 17B:
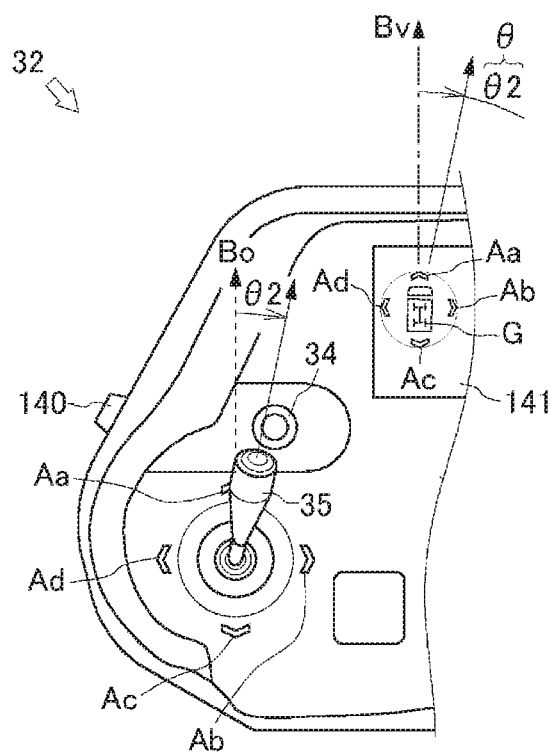
FIG. 17B is a partially enlarged view illustrating a conveyance direction of a load when a suspended load movement manipulation tool is manipulated in Embodiment 4.

As shown in FIG. 17B, terminal control apparatus 143 (see FIG. 16) calculates the movement direction and the movement rate of load W from manipulation direction reference Bo based on a manipulation signal on tilting angle θ2, which is the angle from manipulation direction reference Bo to the tilting direction of the manipulation stick, the tilting direction, and the tilting amount, obtained from suspended load movement manipulation tool 35. When, for example, suspended load movement manipulation tool 35 is manipulated to tilt by tilting angle θ2 to one of the right and left sides of manipulation direction reference Bo in a state where the direction of manipulation direction reference Bo and the direction of vehicle direction reference By coincide with each other, terminal control apparatus 143 calculates movement angle θ of load W with respect to vehicle direction reference By from correction angle 61 (in FIG. 17B, correction angle θ1 is 0°) and its correction direction (no correction direction is set because correction angle θ1 is 0° in FIG. 17B), set by reference change manipulation tool 34, and tilting angle θ2. Terminal control apparatus 143 calculates a control signal for moving load W at a movement rate according to the tilting amount to the direction of movement angle θ.

Figure 18:
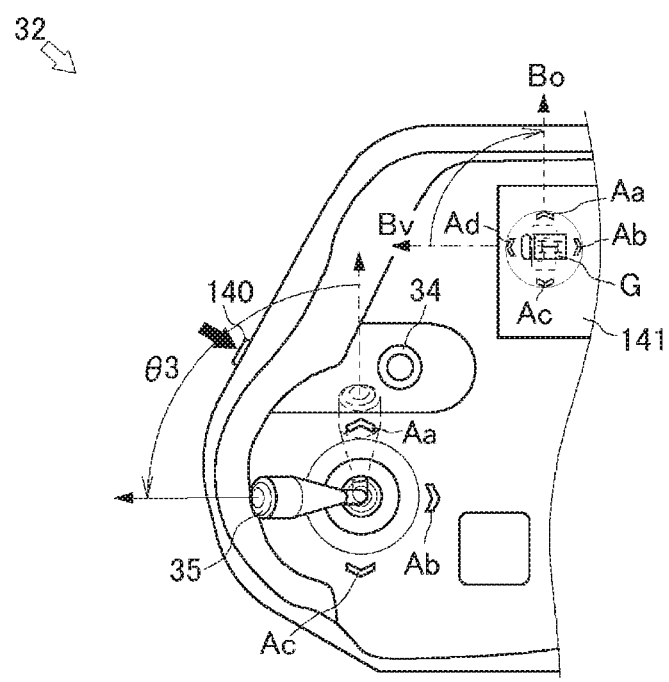
FIG. 18 is a partially enlarged view illustrating a manipulation direction reference when a reference change enable switch is manipulated in Embodiment 4.

As shown in FIG. 18, when terminal control apparatus 143 (see FIG. 16) obtains a manipulation signal from reference change enable switch 140, terminal control apparatus 143 changes the direction of manipulation direction reference Bo with respect to vehicle direction reference By with manipulation of suspended load movement manipulation tool 35 after the manipulation signal is obtained. Specifically, after terminal control apparatus 143 obtains a manipulation signal from reference change enable switch 140, when suspended load movement manipulation tool 35 is rotated by manipulation angle θ3 toward one side in the right-hand-left-hand direction (in the counterclockwise direction in FIG. 18), terminal control apparatus 143 causes manipulation direction reference Bo to rotate by manipulation angle θ3 from vehicle direction reference By toward the other side in the right-hand-left-hand direction (in the clockwise direction in FIG. 18) in synchronization with manipulation of suspended load movement manipulation tool 35.

When terminal control apparatus 143 obtains a manipulation signal from reference change enable switch 140, terminal control apparatus 143 locks a control signal related to the movement direction of crane apparatus 6, which is generated based on the tilting direction of suspended load movement manipulation tool 35 manipulated at that time, and the tilting angle that is the angle from manipulation direction reference Bo to the tilting direction of the manipulation stick. In other words, when terminal control apparatus 143 obtains a manipulation signal from reference change enable switch 140, terminal control apparatus 143 locks a control signal related to the movement direction, to be transmitted to crane apparatus 6, to a control signal related to the movement direction, which has been transmitted at the time when reference change enable switch 140 is manipulated, and transmits the locked control signal to crane apparatus 6 regardless of the tilting direction of suspended load movement manipulation tool 35 thereafter.

When, for example, terminal control apparatus 143 obtains a manipulation signal from reference change enable switch 140 in a state where suspended load movement manipulation tool 35 is manipulated to tilt by tilting angle θ2 to one of the right and left sides of manipulation direction reference Bo, terminal control apparatus 143 locks a control signal related to the movement direction of crane apparatus 6 to a control signal at the time when suspended load movement manipulation tool 35 is manipulated to tilt by tilting angle θ2 from manipulation direction reference Bo to one of the right and left sides.

When the manipulation signal from reference change enable switch 140 stops, terminal control apparatus 143 locks the position of manipulation direction reference Bo from vehicle direction reference By to a position changed by manipulation angle θ3. Thus, in remote operation terminal 32, even when the position of manipulation direction reference Bo is changed by manipulation of suspended load movement manipulation tool 35 during manipulation of reference change enable switch 140, a control signal related to the same movement direction is transmitted to crane apparatus 6 before and after manipulation of reference change enable switch 140.

Next, setting of manipulation direction reference Bo in remote operation terminal 32 and control of crane apparatus 6 by using remote operation terminal 32 will be described with reference to FIGS. 19 to 21A and 21B. As the directions of vehicle 2 of crane 1, a forward travel direction of vehicle 2 (a direction toward cabin 17 from boom 9) is defined as forward direction, a reverse travel direction (a direction across boom 9) is defined as rearward direction, a right-hand side when facing the forward direction is defined as right-hand direction, and a left-hand side when facing the forward direction is defined as left-hand direction. In the present embodiment, it is assumed that vehicle direction reference By (the alternate long and short dashed-line arrow in FIGS. 17A and 17B to 21A and 21B) is set to the forward direction of vehicle 2 and manipulation direction reference Bo (the dashed-line arrows in FIGS. 17A and 17B to 21A and 21B) of remote operation terminal 32 is set to an upward direction (arrow Aa direction shown on suspended load movement manipulation tool 35 and display apparatus 141) when facing the operating face of case 133. It is assumed that, for correction angle θ and tilting angle θ2, the counterclockwise direction from arrow Aa direction is defined as positive direction, the clockwise direction from arrow Aa direction is defined as negative direction, and the sign is used in adding or subtracting angles.

Figure 19:
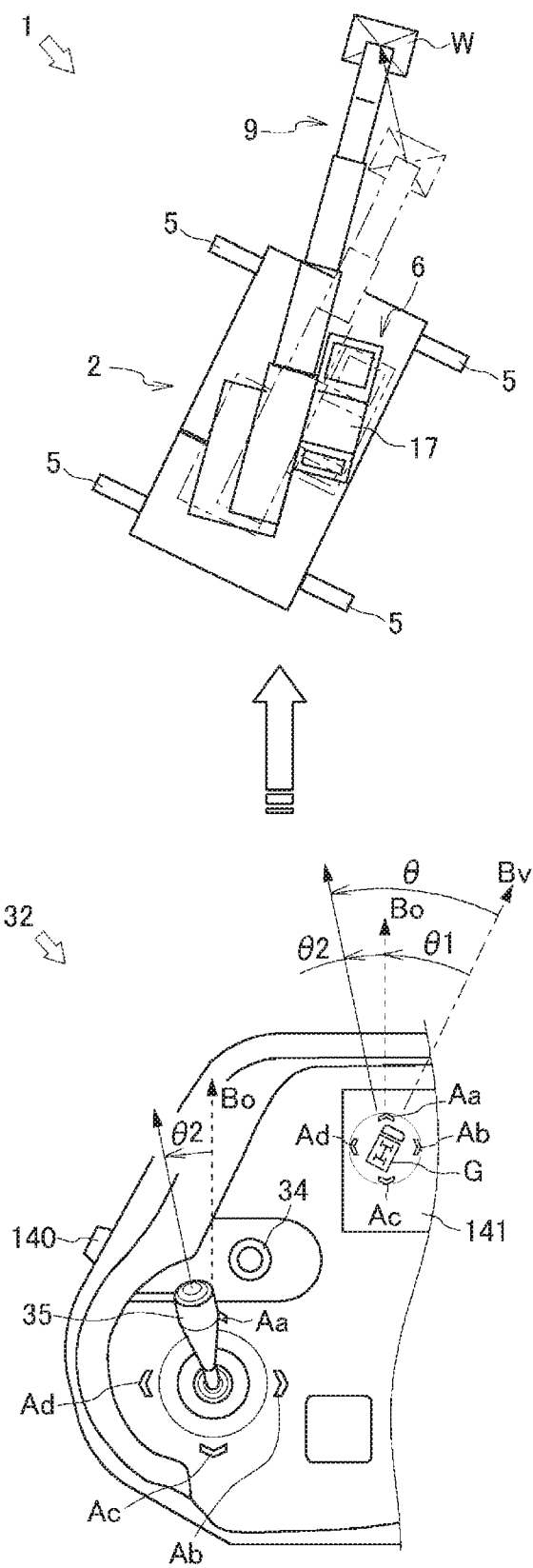
FIG. 19 is a schematic view illustrating the remote operation terminal in which the suspended load movement manipulation tool is manipulated and a state of movement of the crane resulting from the manipulation in Embodiment 4.

As shown in FIG. 19, when reference change manipulation tool 34 is manipulated to rotate by correction angle θ1 in the clockwise direction from vehicle direction reference By (see FIG. 17A) as a rotation position in which vehicle direction reference By and manipulation direction reference Bo do not coincide with each other, remote operation terminal 32 corrects manipulation direction reference Bo to the position rotated by correction angle θ1 in the counterclockwise direction that is the correction direction from vehicle direction reference By. In other words, for remote operation terminal 32, manipulation direction reference Bo is set to the position rotated by correction angle θ1 from vehicle direction reference By in the counterclockwise direction. At this time, on display apparatus 141 of remote operation terminal 32, reference graphic G that schematically illustrates vehicle 2 of crane 1 and of which the forward direction is directed toward the direction of correction angle θ1 from arrow Aa that is manipulation direction reference Bo in the clockwise direction is shown.

When, for example, suspended load movement manipulation tool 35 of remote operation terminal 32 is manipulated to tilt by a selected tilting amount in the direction of tilting angle θ2 in the counterclockwise direction from arrow Aa that is manipulation direction reference Bo as a tilting manipulation of suspended load movement manipulation tool 35 in a selected direction, terminal control apparatus 143 obtains, from the sensor (not shown) of suspended load movement manipulation tool 35, a manipulation signal on tilting angle θ2 that is the angle from manipulation direction reference Bo to the tilting direction in the counterclockwise direction (positive direction) of the manipulation stick, and the tilting amount. In addition, terminal control apparatus 143 calculates a control signal to move load W in the movement direction of movement angle θ=correction angle θ1+tilting angle θ2 at a movement rate according to the tilting amount from the obtained manipulation signal and correction angle θ1 in the counterclockwise direction (positive direction), which is a correction amount of manipulation direction reference Bo from vehicle direction reference By. Remote operation terminal 32 generates control signals for associated swiveling valve 23, extension/retraction valve 24, luffing valve 25, main valve 26m, and sub valve 26s based on movement angle θ and the tilting amount, calculated in terminal control apparatus 143, and transmits the control signals to crane 1 by using terminal communication device 142.

Terminal control apparatus 143 does not execute a process of rotating manipulation direction reference Bo with respect to vehicle direction reference By at the time when a manipulation signal on correction angle 61 is obtained from reference change manipulation tool 34 while obtaining a manipulation signal on the tilting direction, tilting angle θ2 and the tilting amount of suspended load movement manipulation tool 35, that is, while generating a control signal for crane apparatus 6 to move load W.

Figure 20A:
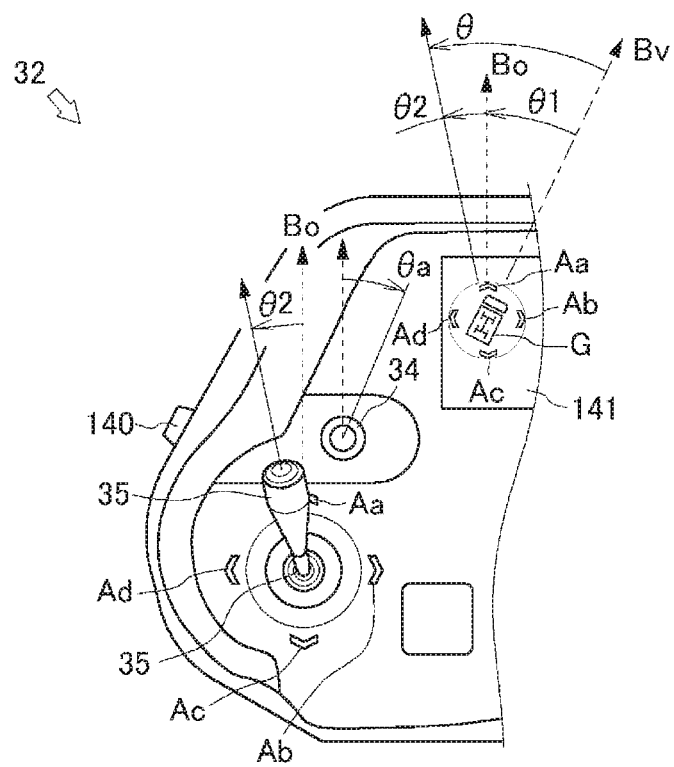
FIG. 20A is a partially enlarged view illustrating an manipulation direction reference when the reference change manipulation tool is manipulated in a state where the suspended load movement manipulation tool of the remote operation terminal is manipulated in Embodiment 4.

Even when, for example, reference change manipulation tool 34 is manipulated to rotate by angle θa in one direction as shown in FIG. 20A, terminal control apparatus 143 determines that the manipulation signal of reference change manipulation tool 34 is invalid and does not make correction to further rotate manipulation direction reference Bo by angle θa.

Terminal control apparatus 143 executes a process of rotating manipulation direction reference Bo with respect to vehicle direction reference By at the time when a manipulation signal on correction angle 61 is obtained from reference change manipulation tool 34 while not obtaining a manipulation signal on the tilting direction, tilting angle θ2 and the tilting amount of suspended load movement manipulation tool 35, that is, while not generating a control signal for crane apparatus 6 to move load W.

Figure 20B:
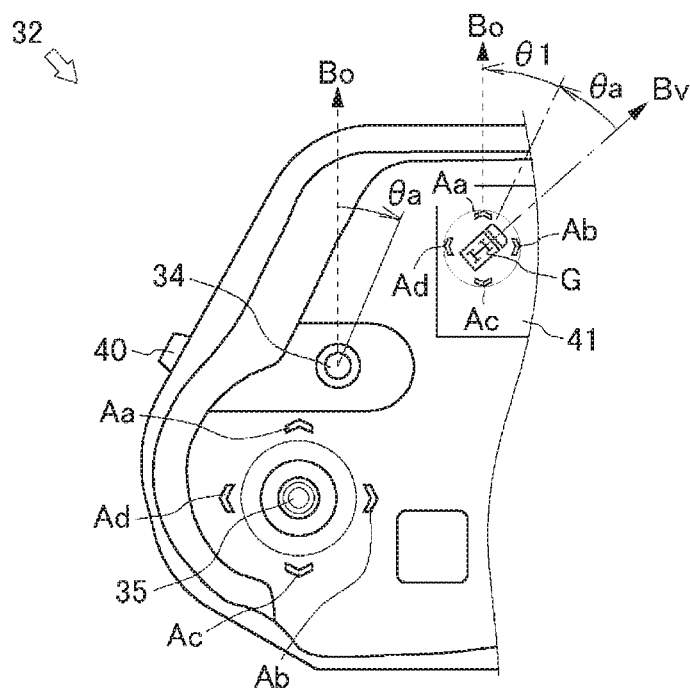
FIG. 20B is a partially enlarged view illustrating an manipulation direction reference when the reference change manipulation tool is manipulated in a state where the suspended load movement manipulation tool of the remote operation terminal is not manipulated in Embodiment 4.

Even when, for example, reference change manipulation tool 34 is manipulated to rotate by angle θa in one direction as shown in FIG. 20B, terminal control apparatus 143 makes correction to further rotate manipulation direction reference Bo by angle θa based on the manipulation signal of reference change manipulation tool 34.

Figure 21A:
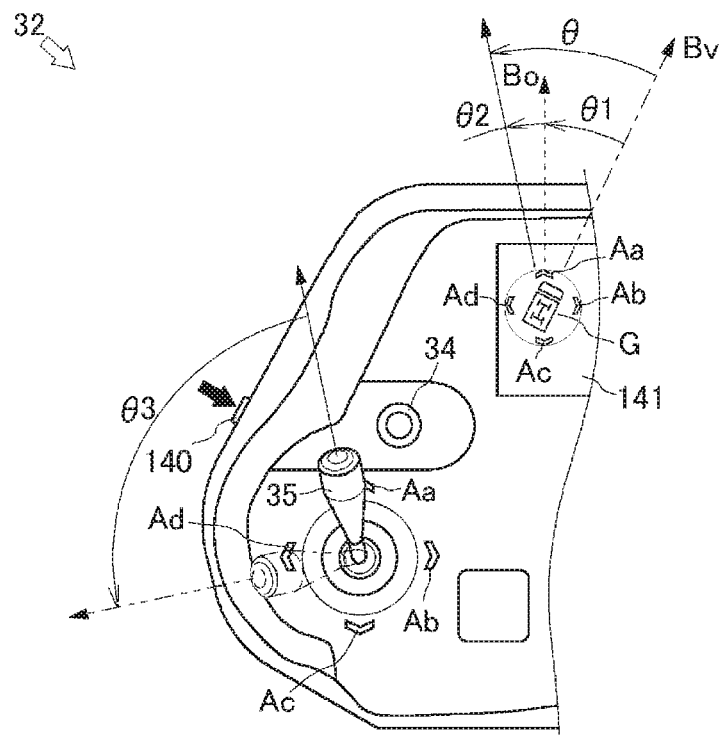
FIG. 21A is a partially enlarged view illustrating an manipulation direction reference before the reference change manipulation tool is manipulated in a state where the reference change enable switch of the remote operation terminal is manipulated in Embodiment 4.
Figure 21B:
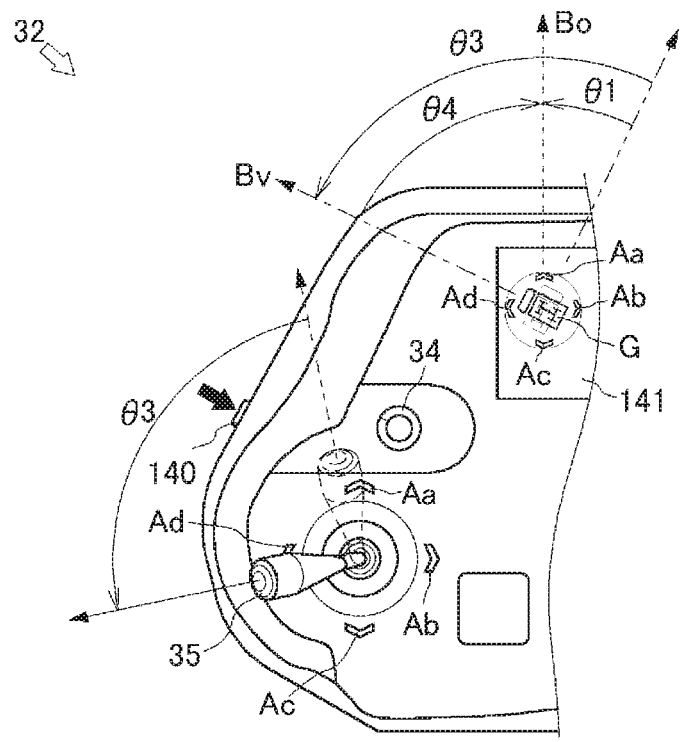
FIG. 21B is a partially enlarged view illustrating an manipulation direction reference when the reference change manipulation tool is manipulated in a state where the reference change enable switch of the remote operation terminal is manipulated in Embodiment 4.

When crane 1 receives a control signal for movement angle θ and a movement rate according to the tilting amount of load W from remote operation terminal 32 as shown in FIGS. 21A and 21B, crane 1 moves load W at a rate according to the tilting amount in the direction of movement angle θ of load W from the forward direction of vehicle 2, which is vehicle direction reference Bv. Since suspended load movement manipulation tool 35 is tilted by a predetermined tilting amount at tilting angle θ2 from arrow Aa in the counterclockwise direction (positive direction), crane 1 moves load W in the direction of movement angle θ of load W=correction angle θ1+tilting angle θ2 in the counterclockwise direction (positive direction) of vehicle direction reference By at a conveyance rate corresponding to the tilting amount of suspended load movement manipulation tool 35. At this time, crane 1 controls hydraulic swivel motor 8, the hydraulic retraction cylinder, hydraulic luffing cylinder 12, the main hydraulic motor, and the like in accordance with a movement path of load W.

During manipulation of reference change enable switch 140 (see the solid arrow), when suspended load movement manipulation tool 35 is manipulated to tilt by manipulation angle θ3 in the counterclockwise direction from a state of being manipulated to tilt by tilting angle θ2 to the left side of manipulation direction reference Bo (see FIG. 18) as shown in FIG. 21A, terminal control apparatus 143 causes vehicle direction reference By to rotate by manipulation angle θ3 in the counterclockwise direction as shown in FIG. 21B. At the same time, terminal control apparatus 143 causes reference graphic G displayed on display apparatus 141 to rotate by manipulation angle θ3 in the counterclockwise direction. In other words, terminal control apparatus 143 changes the position of manipulation direction reference Bo from vehicle direction reference By in the clockwise direction to the position of change angle θ4=manipulation angle θ3−correction angle θ1.

Figure 22:
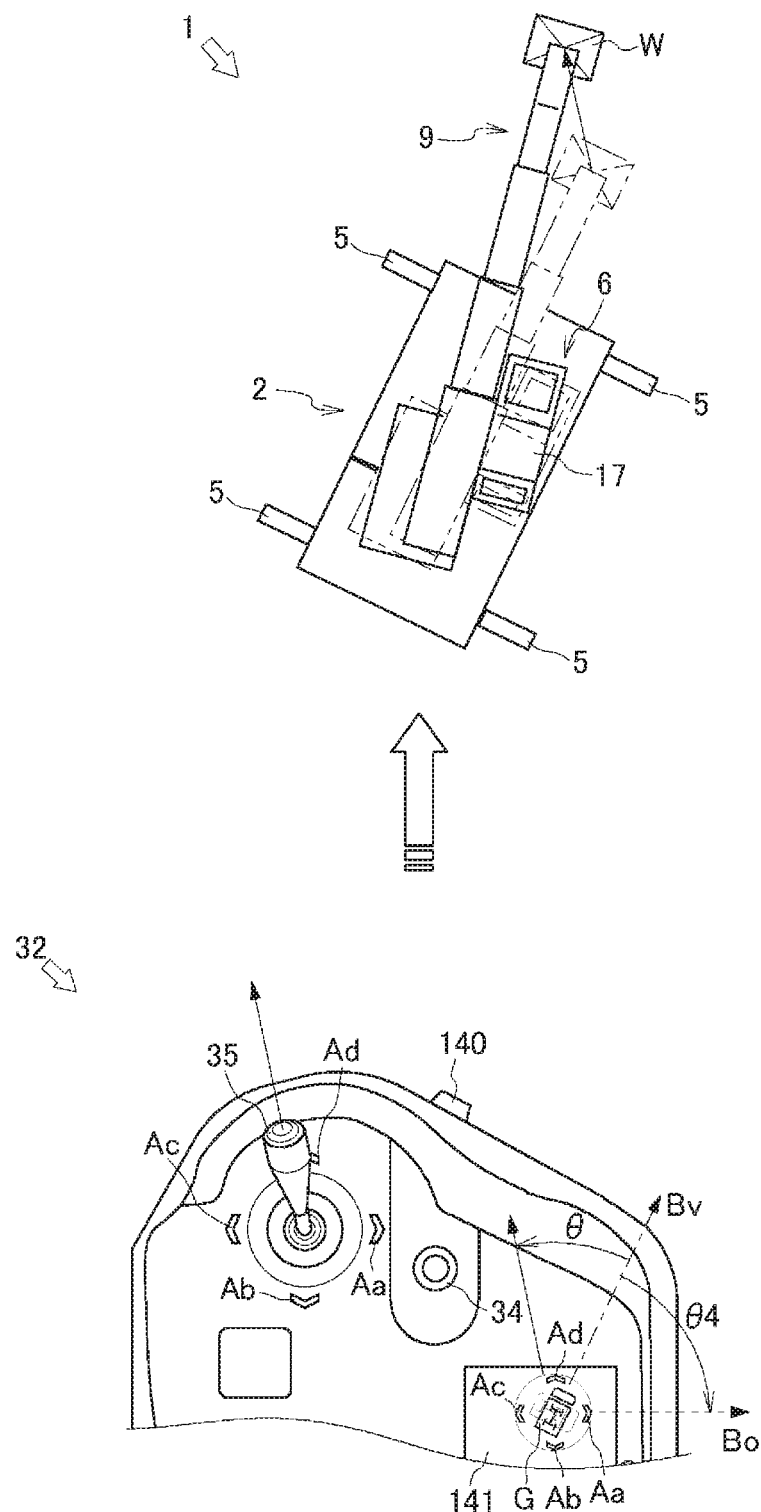
FIG. 22 is a schematic view illustrating a manipulation direction reference and a state of movement of the crane when the manipulation direction reference is changed by using the reference change enable switch of the remote operation terminal in Embodiment 4.

As shown in FIG. 22, terminal control apparatus 143 is configured to equalize the positional relation between suspended load movement manipulation tool 35 after the tilting direction is changed and vehicle direction reference By to the positional relation between suspended load movement manipulation tool 35 before the tilting direction is changed and vehicle direction reference By (see FIG. 21A) by changing the position of manipulation direction reference Bo from vehicle direction reference By with a change in the tilting direction of suspended load movement manipulation tool 35. Terminal control apparatus 143 calculates a control signal to move load W in the movement direction of movement angle θ=correction angle θ1+tilting angle θ2 (see FIG. 21A) of load W from vehicle direction reference By at a movement rate according to the tilting amount based on the obtained manipulation signal of suspended load movement manipulation tool 35 and change angle θ4 in the clockwise direction (negative direction) that is a reference change amount of manipulation direction reference Bo from vehicle direction reference By. Remote operation terminal 32 generates control signals for associated swiveling valve 23, extension/retraction valve 24, luffing valve 25, main valve 26m, and sub valve 26s based on movement angle θ and the tilting amount, calculated in terminal control apparatus 143, and transmits the control signals to crane 1 by using terminal communication device 142.

With such a configuration, in crane 1, an operator sets manipulation direction reference Bo of suspended load movement manipulation tool 35 to a selected value as a relative angle to vehicle direction reference Bv of work vehicle 2 with reference change manipulation tool 34 from remote operation terminal 32 without grasping a relative position of remote operation terminal 32 to crane apparatus 6. At this time, display apparatus 141 of remote operation terminal 32 displays manipulation direction reference Bo with respect to vehicle direction reference By, so an operator more easily visually grasp the relation between vehicle direction reference By and manipulation direction reference Bo. Furthermore, in crane 1, when reference change enable switch 140 is manipulated, manipulation direction reference Bo is changed to a direction desired by the operator through manipulation of suspended load movement manipulation tool 35 in a state where the movement direction of crane apparatus 6 by manipulation of suspended load movement manipulation tool 35 is locked. Therefore, even when the positional relation between load W and remote operation terminal 32 varies as a result of movement of load W by crane apparatus 6, the operator does not lose the identified movement direction of crane apparatus 6 for the tilting direction of suspended load movement manipulation tool 35 during operation. Thus, erroneous manipulation during remote operation of crane apparatus 6 is prevented, and it is possible to easily and simply perform remote operation of the crane apparatus 6.

In the present embodiment, remote operation terminal 32 is configured to be capable of changing manipulation direction reference Bo with reference change manipulation tool 34 or suspended load movement manipulation tool 35. Alternatively, vehicle 2 of crane 1 and remote operation terminal 32 may be respectively provided with a vehicle azimuth sensor and a terminal azimuth sensor that serve as a reference setting section that automatically sets the reference of the movement direction of crane apparatus 6 and may be configured to set manipulation direction reference Bo and vehicle direction reference Bv by automatically detecting the respective azimuths.

Next, a mode of display of video image i of load W by means of camera 9b will be described with reference to FIGS. 23A, 23B. 24A, and 24B. Crane 1 is capable of causing display apparatus 141 of remote operation terminal 32 to display video image i from camera 9b provided at the distal end portion of boom 9.

Terminal control apparatus 143 (see FIG. 16) of remote operation terminal 32 is capable of obtaining video image i taken by camera 9b via terminal communication device 142. Terminal control apparatus 143 is also capable of displaying positioning mark Ma in the obtained image (see FIGS. 23A and 23B). Terminal control apparatus 143 is capable of rotating obtained video image i in accordance with a manipulation signal (FIGS. 23A and 23B) of reference change manipulation tool 34 or a manipulation signal of suspended load movement manipulation tool 35 and causing display apparatus 141 to display video image i (see FIGS. 24A and 24B). Terminal control apparatus 143 is capable of displaying movement mark Mt in accordance with the obtained manipulation signal of suspended load movement manipulation tool 35 (see FIGS. 24A and 24B).

Figure 23A:
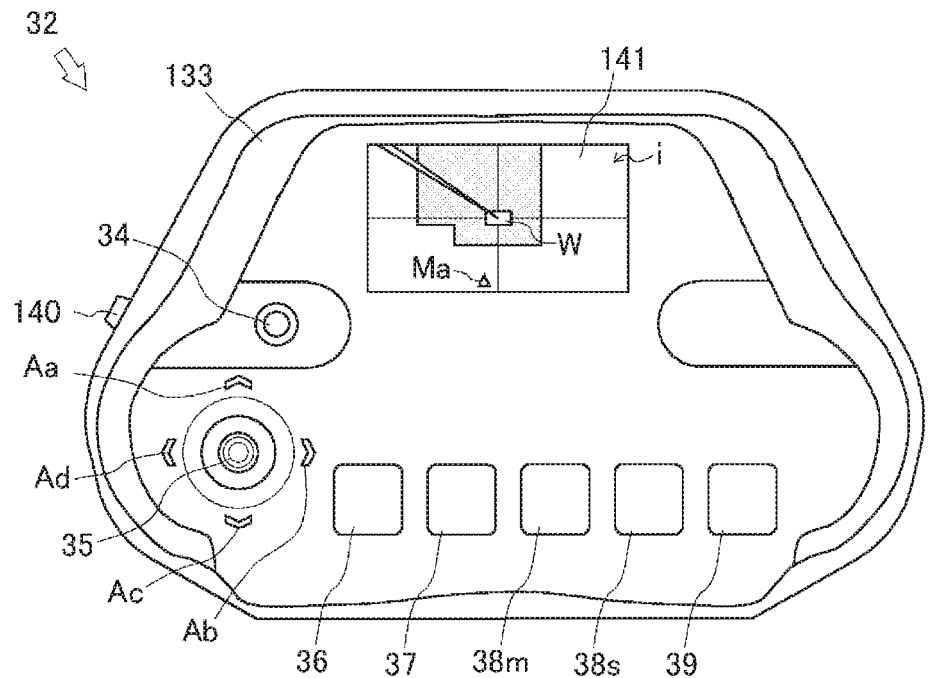
FIG. 23A is an enlarged view illustrating a video image from a camera, displayed on the remote operation terminal in Embodiment 4.

As shown in FIG. 23A, video image i from vertically above load W, which is being taken by camera 9b, is displayed on display apparatus 141. Video image i contains video image i in a predetermined area about load W. In addition to video image i in a predetermined area about load W, positioning mark Ma (triangle mark in the present embodiment) indicating a positioned direction of vehicle 2 or crane apparatus 6 is shown on display apparatus 141. Thus, an operator is able to constantly grasp the positioned direction of vehicle 2 or crane apparatus 6 from load W on video image i regardless of the orientation of camera 9b with respect to vehicle 2 or crane apparatus 6. The frame shape of video image i to be displayed on display apparatus 141 may be rectangular or circular.

Figure 23B:
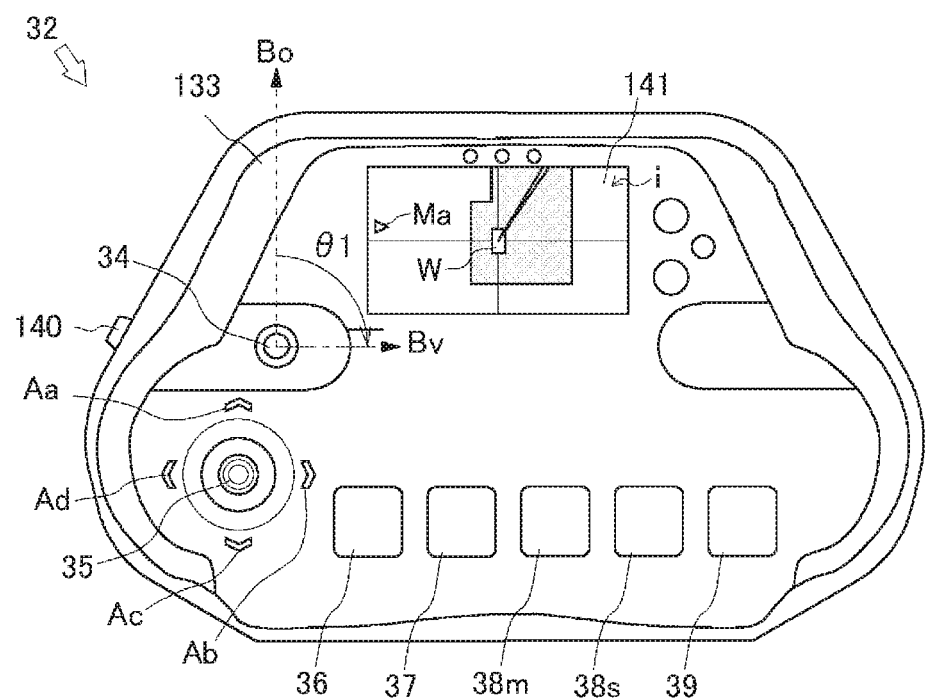
FIG. 23B is an enlarged view illustrating a video image from the camera, displayed on the remote operation terminal when the reference change manipulation tool of the remote operation terminal is manipulated in Embodiment 4.

As shown in FIG. 23B, when terminal control apparatus 143 of remote operation terminal 32 obtains a manipulation signal on the rotation direction that is the rotation position obtained from reference change manipulation tool 34 manipulated to rotate and correction angle θ1 that is the angle from vehicle direction reference Bv, terminal control apparatus 143 rotates video image i, displayed on display apparatus 141, by correction angle θ1. When, for example, reference change manipulation tool 34 is manipulated to rotate from manipulation direction reference Bo to the position of angle θ1 in one direction (in the clockwise direction in FIG. 17A), terminal control apparatus 143 rotates video image i and positioning mark Ma by correction angle θ1 in one direction and causes display apparatus 141 to display video image i and positioning mark Ma.

Furthermore, in addition to video image i in a predetermined area about load W, movement mark Mt (solid arrow in FIGS. 24A and 24B in the present embodiment) indicating the movement direction and the movement rate of load W may be displayed on display apparatus 141 in accordance with the tilting direction of suspended load movement manipulation tool 35. Thus, an operator is able to constantly grasp the movement direction of load W on video image i regardless of the orientation of camera 9b with respect to vehicle 2 or crane apparatus 6.

Figure 24A:
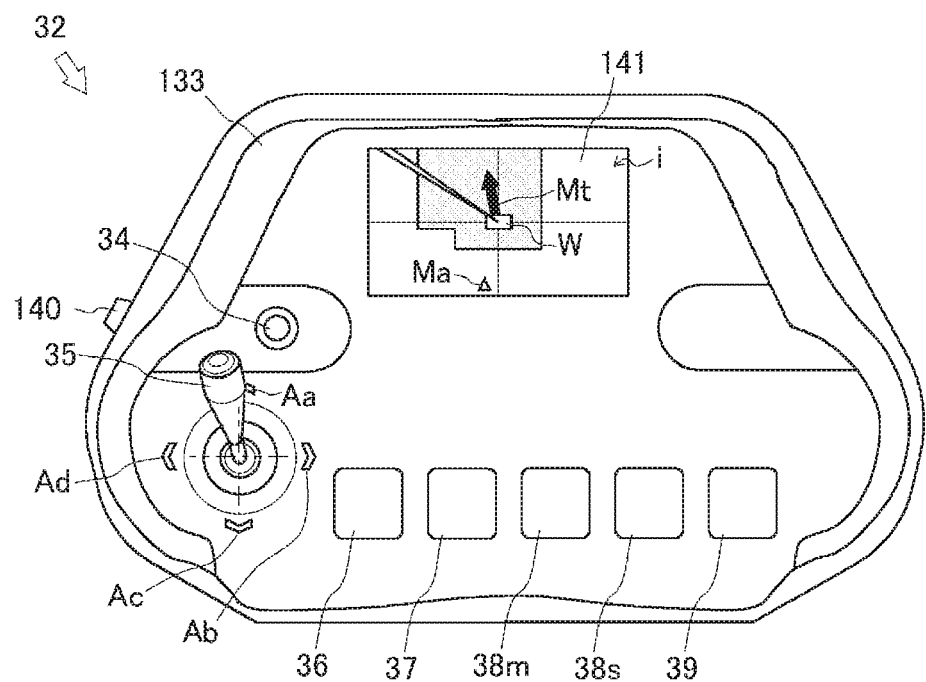
FIG. 24A is an enlarged view illustrating a state where positioning mark Ma and movement mark Mt are displayed in a video image from the camera, displayed on the remote operation terminal in Embodiment 4.

As shown in FIG. 24A, in a state where suspended load movement manipulation tool 35 is manipulated to a selected tilting angle θ2, video image i from vertically above load W, which is being taken by camera 9b, is displayed on display apparatus 141. Positioning mark Ma (triangle mark in the present embodiment) indicating the positioned direction of vehicle 2 or crane apparatus 6 about load W and movement mark Mt (the solid arrow in the present embodiment) indicating the movement direction and the movement rate of load W are shown in video image i. When terminal control apparatus 143 obtains a manipulation signal on the tilting angle from manipulation direction reference Bo to the tilting direction of the manipulation stick, the tilting direction and the tilting amount, obtained from suspended load movement manipulation tool 35, terminal control apparatus 143 causes display apparatus 141 to display an arrow that points the movement direction of load W as movement mark Mt in size according to the movement rate of load W.

Figure 24B:
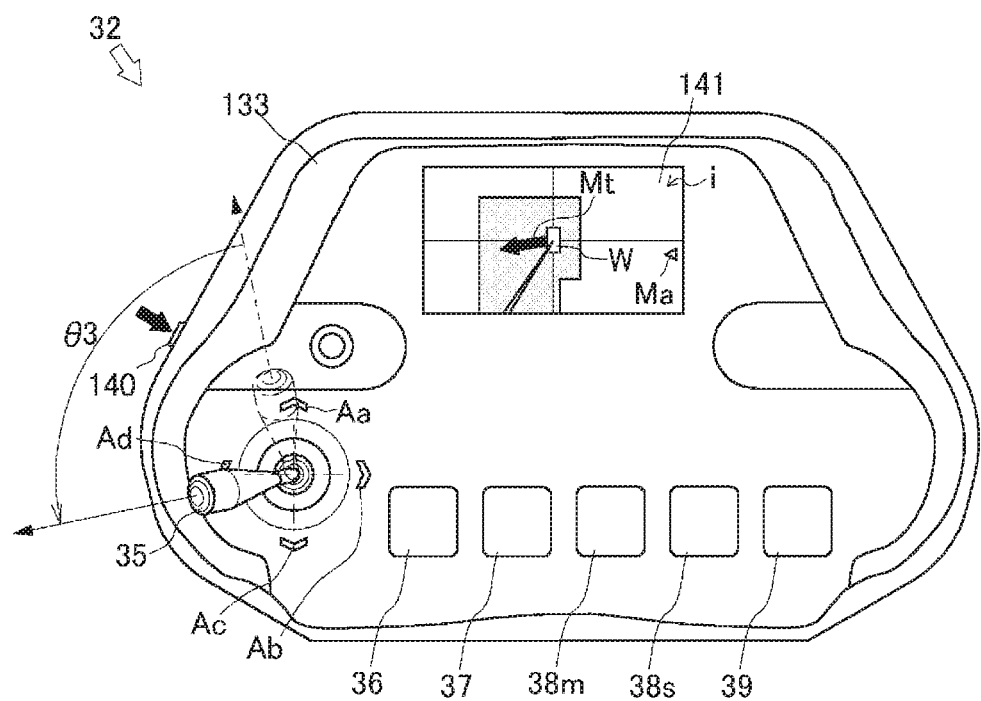
FIG. 24B is an enlarged view illustrating a video image from the camera, displayed on the remote operation terminal, when an manipulation direction reference is changed with the suspended load movement manipulation tool and the reference change enable switch of the remote operation terminal in Embodiment 4.

As shown in FIG. 24B, when suspended load movement manipulation tool 35 is manipulated to tilt by manipulation angle θ3 to the left side from a position tilted to a selected direction in a state where reference change enable switch 140 is manipulated, and when terminal control apparatus 143 of remote operation terminal 32 obtains a manipulation signal of reference change enable switch 140 and a manipulation signal on manipulation angle θ3, terminal control apparatus 143 rotates video image i, containing positioning mark Ma and movement mark Mt and displayed on display apparatus 141, in the counterclockwise direction by manipulation angle θ3.

With such a configuration, an operator constantly identifies the positioned direction of crane 1 in video image i with positioning mark Ma and constantly identifies the movement direction and the movement rate of load W with movement mark Mt, so the positional relation among crane 1, load W, and its surroundings is easily grasped. Furthermore, the operator is able to change manipulation direction reference Bo and change the display direction of video image i with suspended load movement manipulation tool 35 and reference change enable switch 140 in accordance with the positional relation between load W to be moved by crane apparatus 6 and remote operation terminal 32. Thus, in crane 1, it is possible to easily and simply perform remote operation of crane apparatus 6 by way of visual identification of video image i from an appropriate viewpoint direction.

The above-described embodiments are only typical modes and may be modified in various forms without departing from the main point of each embodiment. Furthermore, the present invention can be, of course, implemented in various forms, and the scope of the present invention is described in the claims and encompasses equivalents of the claims and all modifications within the scope.

INDUSTRIAL APPLICABILITY

The present invention is applicable to a remote operation terminal and a work vehicle provided with a remote operation terminal.

REFERENCE SIGNS LIST

1 Crane
6 Crane apparatus
31 Control apparatus
32 Remote operation terminal
34 Reference change manipulation tool
35 Suspended load movement manipulation tool
42 Terminal control apparatus
133 Case
140 Reference change enable switch
141 Display apparatus
142 Terminal communication device
143 Terminal control apparatus

The invention claimed is:

1. A remote operation terminal for a work apparatus provided in a work vehicle, the remote operation terminal comprising:
a control section that is configured to be capable of obtaining a signal from a control apparatus of the work apparatus and that controls operation of the remote operation terminal;
a first manipulation section used to remotely operate the work apparatus; and
a second manipulation section used to set a reference of a direction in which the work apparatus moves as a result of manipulation of the first manipulation section, wherein
the control section calculates a direction in which the work apparatus moves for manipulation of the first manipulation section, based on a set value of the second manipulation section and transmits the direction to the control apparatus, and disables a change of the set value while the first manipulation section is being manipulated.

2. The remote operation terminal according to claim 1, wherein, when the control section obtains a manipulation signal from the first manipulation section, the control section transmits, to the control apparatus, a control signal converted from the manipulation signal of the first manipulation section based on the set value of the second manipulation section, and while obtaining the manipulation signal, the control section invalidates a manipulation signal of the second manipulation section.

3. The remote operation terminal according to claim 1, further comprising:
a third manipulation section that enables transmission of a control signal converted from a manipulation signal of the first manipulation section based on the set value of the second manipulation section, wherein
while the control section is obtaining a manipulation signal from the third manipulation section, the control section enables transmission of the control signal to the control apparatus and invalidates a manipulation signal of the second manipulation section.

4. The remote operation terminal according to claim 1, wherein
the set value of the second manipulation section is a set value that corrects a reference direction on an operating face of the remote operation terminal, and
the direction in which the work apparatus moves is calculated so as to correspond to an angle difference between the reference direction on the operating face and a manipulation direction of manipulation made for the first manipulation section.

5. The remote operation terminal according to claim 1, further comprising a fourth manipulation section that locks a control signal related to a tilting direction within a control signal of the first manipulation section and enables a change of the manipulation direction reference with the first manipulation section.

6. The remote operation terminal according to claim 1, further comprising a reference setting section that automatically sets the manipulation direction reference.

7. A remote operation terminal for a work apparatus provided in a work vehicle, the remote operation terminal comprising:
a control section that is configured to be capable of communicating with a control apparatus of the work apparatus and that controls operation of the remote operation terminal;
a first manipulation section used to remotely operate the work apparatus; and
a reference setting section that automatically sets a reference of a direction in which the work apparatus moves as a result of manipulation of the first manipulation section, wherein
the control section calculates a direction in which the work apparatus moves for manipulation of the first manipulation section based on a set value of the reference setting section and transmits the direction to the control apparatus, and disables a change of the set value while the first manipulation section is being manipulated.

8. A remote operation terminal for a work apparatus provided in a work vehicle, the remote operation terminal comprising:
a control section that is configured to be capable of obtaining a signal from a control apparatus of the work apparatus and that controls operation of the remote operation terminal;
a first manipulation section used to remotely operate the work apparatus based on a manipulation direction reference of the remote operation terminal; and
a second manipulation section used to lock a control signal related to a tilting direction within a control signal of the first manipulation section and to enable a change of the manipulation direction reference with the first manipulation section.

9. The remote operation terminal according to claim 8, wherein, when the control section obtains a manipulation signal to change a tilting direction of the first manipulation section in a state where a manipulation signal from the second manipulation section is obtained, the control section locks the control signal related to the tilting direction to a control signal related to the tilting direction of the first manipulation section before the tilting direction is changed, and transmits the control signal to the control apparatus, and changes the manipulation direction reference such that the tilting direction of the first manipulation section of which the tilting direction is changed becomes the tilting direction of the first manipulation section before the tilting direction is changed.

10. The remote operation terminal according to claim 8, wherein, when the control section determines that a manipulation signal from the second manipulation section is stopped or when the control section obtains a manipulation signal to disable a change of the manipulation direction reference from the second manipulation section, the control section locks the changed manipulation direction reference and releases locking of the control signal related to the tilting direction of the first manipulation section.

11. The remote operation terminal according to claim 8, wherein
- the control signal related to the tilting direction of the first manipulation section is a signal that defines the direction in which the work apparatus moves, in accordance with an angle difference between the manipulation direction reference and the tilting direction, and
- in a case where the change of the manipulation direction reference is enabled by manipulation of the second manipulation section, the control section changes a direction of the manipulation direction reference to a direction in accordance with the tilting direction of the first manipulation section, and locks the control signal related to the tilting direction of the first manipulation section, thereby locking the direction in which the work apparatus moves to the direction before the direction of the manipulation direction reference is changed.

* * * * *